United States Patent [19]
Gerber

[11] Patent Number: 6,079,449
[45] Date of Patent: Jun. 27, 2000

[54] SYSTEM FOR DELIVERING AND MAINTAINING THE STERILITY AND INTEGRITY OF FLOWABLE MATERIALS

[75] Inventor: Bernard R. Gerber, Santa Cruz, Calif.

[73] Assignee: Waterfall Company, Inc., Capitola, Calif.

[21] Appl. No.: 09/241,178

[22] Filed: Feb. 1, 1999

[51] Int. Cl.$^7$ ............................... B65D 5/72; F16K 15/14
[52] U.S. Cl. ...................... 137/859; 137/846; 137/512.3; 222/494; 604/247
[58] Field of Search ..................................... 137/859, 844, 137/845, 846, 849, 853, 843, 860, 512.3, 512.4; 222/494, 490; 604/247, 213

[56] References Cited

U.S. PATENT DOCUMENTS

| | | | |
|---|---|---|---|
| 3,534,771 | 10/1970 | Eyerdam | 222/494 |
| 3,631,877 | 1/1972 | Barosko | 137/588 |
| 4,254,791 | 3/1981 | Bron | 137/853 |
| 4,346,704 | 8/1982 | Kulle | 137/860 |
| 4,474,314 | 10/1984 | Roggenburg, Jr. | 222/494 |
| 4,568,333 | 2/1986 | Sawyer et al. | 137/860 |
| 4,846,810 | 7/1989 | Gerber | 604/247 |
| 5,080,138 | 1/1992 | Haviv | 137/853 |
| 5,092,855 | 3/1992 | Pardes | 604/247 |
| 5,305,786 | 4/1994 | Debush | 137/512.4 |
| 5,390,822 | 2/1995 | Lataix | 222/494 |
| 5,431,310 | 7/1995 | Kanner et al. | 222/494 |
| 5,472,122 | 12/1995 | Appleby | 222/494 |
| 5,836,484 | 11/1998 | Gerber | 222/494 |
| 5,950,878 | 9/1999 | Wade et al. | 222/494 |

*Primary Examiner*—Denise L. Ferensic
*Assistant Examiner*—Joanne Y. Kim
*Attorney, Agent, or Firm*—Woodside Intellectual Property Law Group; Michael Hetherington

[57] ABSTRACT

A system is provided for contamination free delivery and control of a flowable medium contained in an enclosed flow path or a container. The system is highly scalable in size and works even with viscous fluids which are difficult to flow. The device enables a flowable material to be formulated without anti-oxidants, preservatives or anti microbial agents. This provides the advantage of an enhanced therapeutic effect for many medications, especially those which are considered labile. The device also preserves the integrity and sterility of a flowable material contained in an enclosed flow path such as blood plasma, and is effective against microbial as well as viral challenges. The device can be used to maintain the carbonation of a carbonated flowable medium. The system provides a seat and reversibly deformable seal disposed in the flow path; wherein the seal and seat are moveable between a closed and open state upon the deformation of the seal. In the closed state, the sealing surface between the seal and seat entraps one or more layers of the flowable material which forms a bonding action between the seal and seat to prevent entry of external matter into the flow path while at the same time forming a barrier against the back flow migration of contaminating matter.

29 Claims, 11 Drawing Sheets

SYSTEM FOR DELIVERING AND MAINTAINING THE STERILITY AND INTEGRITY OF FLOWABLE MATERIALS

BACKGROUND

The field of the invention relates generally to devices for delivering fluids, such as solutions, dispersions, suspensions, gels, pastes, or other like materials having a broad range of viscosities.

In particular, the field of the invention relates to a system for multiple dose controlled delivery of flowable materials. The system provides for unidirectional, laminar flow to increase the rate of delivery at relatively low applied pressures. At the same time the system prevents backflow and contamination of the flowable material from air and airborne pathogens or even from direct contact with microorganisms by immersion in concentrated suspensions of viruses or bacteria, to thereby maintain the sterility and integrity of a flowable material without the need for preservatives, antioxidants or other additives.

The dispensing of flowable materials in a contamination-free manner, especially over prolonged periods of time or in a repetitive manner, such as delivery of multiple doses, presents many difficulties. A major problem to be overcome concerns precise flow control and the prevention of backflow or reflux. External contaminants easily can enter a container through the backflow effect at the end of a delivery cycle.

Many fluids including viscous solutions are delivered through a collapsible or volumetrically reducible container which has a discharge port, such as a hole, nozzle, spout, or other type of opening. The contents of the container, such as a viscous paste, liquid, or other solution are delivered through the discharge port by internal pressure or by squeezing the container. Such a conventional method of dispensing a viscous material is inaccurate and fails to prevent the entry of external contaminants into the container due to a backflow or reflux effect. That is, a conventional system for delivering a fluid typically allows air to replace the fluid that is expressed. In addition, as the volume of fluid in the container is reduced through successive delivery, flow becomes inaccurate, uneven and difficult to control. Such a conventional delivery system is highly undesirable when being used to administer a flowable material which needs to be closely controlled. In addition, if the discharge port is used in a contaminated environment, the entry of air, dust, filaments, airborne pathogens or microbes, quickly can damage the integrity of the contents of the fluid.

For example, many flowable materials are highly labile. Labile substances are difficult to preserve and break down quickly due to oxidation or hydrolysis. Many medications lose their effectiveness quickly when exposed to repeated influx of air or external contaminants in the course of regular use. In addition, many medications lose their effectiveness when combined with antimicrobial agents.

Thus, what is needed is a system for delivering a labile, flowable material, such as a medication, without danger of external contamination or loss of integrity due to exposure to air, dust, filaments, airborne pathogens, or antimicrobial agents. Such an improved delivery system would enhance the effectiveness of a labile medication, such as an ophthalmic solution, and would be capable of maintaining sterility throughout many uses over long periods of time. Such an improved delivery system also would effectively maintain the integrity of a fluid throughout its period of use and would extend the fluid's use life to that of its shelf life.

It has been found that the addition of some antimicrobial agents to labile medications not only can shorten overall use life and effectiveness, but also may produce deleterious side effects on a patient, such as delaying post-surgery healing rates. Conventional approaches to dispensing a flowable medium while alleging to prevent air, airborne pathogens or microbial contaminants from degrading the integrity of the flowable medium have not demonstrated they can do so, nor prevent viruses or bacteria from entering the dispensing container through contact or immersion. Therefore, it would be advantageous to develop a system for delivery of a flowable medication without contamination, even on direct contact with viruses or bacteria. Such a system would enable the medication to be delivered free of antimicrobial agents and therefore would achieve an enhanced therapeutic effect and a substantially prolonged use life.

It also would be advantageous to provide a system for delivery of a fluid, even a highly viscous material at an improved flow rate, such that the unit dosage delivered remained constant over time.

It also would be advantageous to provide an improved system for delivering a viscous material, such as a paste, gel, or other viscous substance, in a highly controlled, constant manner, irrespective of the change in volume of the volumetrically reducible container through repeated usage.

It also would be advantageous to provide a system for delivering a highly viscous material with a constant laminar flow and a simplified unidirectional flow path which could be completely cut off after each use, preventing the entrapment of material and providing a complete seal against contamination even by air or when in direct contact with microbes.

What is also needed is a system for delivering a fluid, such that a predetermined cracking pressure is achieved. The cracking pressure advantageously could be optimized for ease of flow and ease of use. Alternatively, it would be desirable it the cracking pressure also could be made higher, such as for impeding flow for safety considerations.

The foregoing, and other disadvantages of conventional contamination-free delivery systems may be seen with reference to FIGS. 1A–1D. Referring to FIG. 1A, Gerber, U.S. Pat. No. 4,846,810 and Pardes, U.S. Pat. No. 5,092,855 disclose generally a valve or delivery system with central body core, delivery block or seat as shown. The arrows indicate the flow of a flowable material into and through the seat to its exit port. It is assumed that the container of flowable material is attached to the entrance port of the valve and flowable material passes through the valve in the path shown by the arrows. The container is not shown for the sake of simplicity. As is well understood by those skilled in the art, an enclosing sleeve (not shown) surrounds the valve body and constrains the flow of material in the direction shown by the arrows. The enclosing sleeve retains an elastomeric sheath or seal against the valve body, thereby providing a seal between the sheath and valve body. Note that this design produces generally a convoluted flow path having at least four changes of direction for the flowable material (please refer to FIG. 1A).

In accordance with FIG. 1A, each delivery system or valve operates through two sets of ports within the valve body, thus rendering the flow path unnecessarily complex and unsuitable for viscous applications. For example, viscous material may become lodged or retained between the valve body and the enclosing sheath after use of the valve, thereby creating avenues for the entry of airborne pathogens. In addition, the complex flow path constrains the optimized delivery of a viscous material. In contrast, what is needed is a contamination-free delivery system which not only prevents contamination or degradation of the flowable material, but which also accelerates the flow rate of a viscous substance at low applied pressures.

Another conventional delivery system is shown in FIG. 1B. Haviv, U.S. Pat. No. 5,080,138, discloses a valve assembly relying on a sleeve valve and consisting of multiple components. Backflow is prevented by a sheath which permits flowable material to flow out of the valve and attempts to prevent backflow into the container. This device is not suitable for highly viscous solutions which can prevent the sheath valve from returning to its closed position to block backflow or reflux. Also, such a conventional delivery system creates a complicated flow path with four changes of direction as shown by the arrows in FIG. 1B. Such a device does not provide a high rate of flow or ease of flow of a viscous material. It also fails to protect against contamination through immersion in or direct contact with suspensions of viruses or bacteria.

Another example of a conventional delivery system is shown in FIG. 1C. Debush, U.S. Pat. No. 5,305,786 attempts to prevent contamination by an expandable elastomeric sleeve tightly fitted about a valve body with entry and exit ports, as shown by the arrows. However, this solution requires additional material to manufacture the valve and produces a complex flow path, characterized by at least three changes of direction, which is not suitable for delivering a viscous material. (See FIG. 1C.)

FIG. 1D (U.S. Pat. No. 5,836,484) shows a multiple-dose dispensing cartridge for contamination-safe delivery of flowable materials. While this design has been proven effective against airborne or microbial contamination, the design forces the fluid flow path to change direction at least four times between the entry and exit of the fluid, as shown by the arrows in FIG. 1D. Each time the direction of the flow path changes, the velocity and flow rate of the flowable material are reduced. In addition, such a convoluted flow path is not suited to the delivery of large volumes of material. Additionally, a complex flow path with frequent changes of direction is not at all suited to the delivery of a viscous material. Not only would delivery of the viscous material require an inordinate amount of pressure, the closure of the valve would be slowed by numerous pockets of viscous material which could be trapped in the complex flow path. This could lead to ineffective or uneven closing of the valve and may provide an avenue of entry for air, airborne pathogens, or other microbes. In addition, any viscous material left in the complex flow path which is exposed to the air may provide a source of contamination for successive deliveries of that material.

None of the conventional dispensing devices shown generally in FIGS. 1A–1D are simple in construction and capable of delivering a flowable material ranging from low to high viscosity.

In addition, the conventional methods discussed above and as shown in FIGS. 1A–1C may not be capable of maintaining a sterile condition once the apparatus is used or opened to the atmosphere. This is particularly true of viscous solutions which may be trapped in the tortuous flow path when the flow is shut off. A viscous solution often does not permit an efficient sealing of the valve after use, and provides unconformities and pathways for microorganisms such as a virus to enter and contaminate the contents of the container.

Another problem in conventional systems for the delivery of a flowable medium is the inability to achieve a constant flow rate. As the volume of a reducible reservoir containing fluid is decreased, the flow rate of the fluid varies. In addition, the cracking pressure or the pressure at which the viscous medium flows can be affected by the amount of material in the container, the size of the container, the viscosity of the fluid, the flow path of the fluid and like factors. Conventional delivery devices have no way to maintain a constant flow rate.

What is needed is an improved method for delivering fluids of varying viscosity up to many thousands of centipoise. What is also needed is a method and apparatus for achieving an optimized cracking pressure for fluids of varying viscosity. That is, it would be advantageous to set the cracking pressure for the delivery mechanism at an optimal point for ease of activation, particularly for children and the elderly. No conventional device addresses the need for a desired activation threshold to achieve a desired cracking pressure and flow rate.

It also would be advantageous to achieve an optimized cracking pressure for a highly viscous medium, while at the same time maintaining the integrity and sterility of that medium and preventing contamination of that medium from any source, including air or through direct contact even when immersed in suspensions of microbes, such as viruses or bacteria. This advantageously would enable a labile, viscous, flowable medium, such as a medication, to be reformulated without antimicrobial agents or other additives, and to be delivered in a precise unit dose. The ability to deliver large volumes of flowable media at an optimized cracking pressure also would allow for ease of use.

With the exception of U.S. Pat. No. 5,836,484, conventional delivery systems are not scalable to permit high rates of delivery of large volumes of flowable media. Therefore, what is also needed is a delivery system which not only would maintain the sterility and integrity of the flowable medium, but at the same time enable its rate of flow and cracking pressure to be closely controlled at desired values. It also would be advantageous to provide a delivery system capable of achieving high rates of flow of a highly viscous fluid by optimizing the cracking pressure, while at the same time enabling, the flow to be cut off completely, without reflux or any contamination.

Another problem of conventional devices for delivering a flowable medium is the inability to maintain the integrity of a flowable medium and to extend its useful life to that of the shelf life. For example, conventional dispensing devices cannot maintain the carbonation of a multiple use carbonated flowable medium. There is a gradual release of carbonation each time the product is dispensed. Therefore, it also would be desirable to provide a method for dispensing a flowable medium which maintained its integrity, including, carbonation or other inherent properties, and thereby extended the useful life of the product.

SUMMARY

A delivery system or device is disclosed that can be placed in an in vivo or in vitro fluid flow path, such as a catheter; a tissue or organ perfusion system; the neck of a container, flexible bag or tube; or the outlet of a nozzle, syringe or piston, and thereby controls the flow of fluid through or across the device along said flow path. The delivery system can exist in either a closed or an open state. In the closed state, flow is prevented through or across the device from both directions. The flow of fluid from the upstream side of the device is prevented from passing through or across said device and neither fluid nor contaminants on the downstream side of the device can pass through or across said device to the upstream side. In the open state, flow is unidirectional. Fluid on the upstream side of the device can pass through or across said device whereas neither fluid nor airborne or contact surface contaminants on the downstream side of the device can pass through or across said device. The integrity of the fluid on the upstream side of the device is maintained throughout numerous flow cycles over extended periods of time from days to a year or more. If the upstream fluid is initially sterile, the sterility of the remaining upstream fluid will be maintained sterile throughout said numerous flow cycles.

The delivery device comprises at least two components, a plastic seat and an elastomeric seal. In a closed state, the seal is tightly fitted to said seat and flow is prevented through or across said delivery system. In an open state, said seal is separated from said seat and unidirectional flow of fluid from the upstream side of the delivery device can pass through or across said device whereas neither fluid nor airborne or contact surface contaminants on the downstream side of the device can pass through or across said device.

Separation of the seal from its seal-tight fit with the seat; i.e., the transition from the closed to open state, occurs by applying either positive or negative pressure on the seal or fluid held in the container. Depending on the orientation and configuration of the seal and seat, positive or negative pressure will result in either the open or closed state.

A positive pressure on the fluid in the upstream side of the device can be generated by (1) applying pressure to the walls of a flexible reservoir containing said fluid (e.g., a plastic tube or bag): (2) applying pressure directly on the fluid in a reducible container (e.g., a piston or syringe); (3) the hydrostatic head of the fluid in said reservoir; or (4) a fluid containing dissolved gas under pressure, such as a carbonated beverage, in said reservoir.

A negative pressure on the downstream side of the seal can be generated by a force field, either mechanical, electrical, magnetic, or a combination thereof, that results in a separation of said seal from its tight fit with said seat.

The preferred embodiments in systems (1), (2) and (3) above place said seat on the upstream side of the device and its seal on the downstream side. The preferred embodiment of the cylindrical seat in systems (1) and (2) contains a central channel that leads into one or more lateral channels ending in one or more exit ports. In the device's closed state, exit port or ports are blocked by a cylindrical seal when said device is in its closed state. The device's open state occurs by applying positive pressure thereby producing a separation of the seal from the seat, allowing fluid to flow through the seat, between the seal and the seat, and through or across the device.

The preferred embodiment of the seal in system (3) contains a perforation or bore that is occluded by a coaxially aligned barrier surface in a mating engagement with an adjacent seat when said device is in its closed state. The open state, wherein the seal is separated from the seat, can be achieved by pulling the perforated seal in the downstream direction away from its fit on the seat, thereby allowing said fluid to flow through the seat, through the bore in the seal, and through or across the delivery device.

The preferred embodiment in system (4) above places said seat on the downstream side of the device and its seal on the upstream side. Said seal contains a perforation or bore that is occluded by a barrier surface in the seat when said device is in its closed state. The open state, wherein said seal is separated from said seat, is achieved by pushing the perforated seal in the upstream direction away from its fit on the seat thereby allowing said fluid to flow through the perforation in the seal, through the vanes of the seat, and through or across the device.

In order to overcome the above discussed disadvantages of conventional contamination-safe delivery systems for flowable materials, an aspect of the invention provides a contamination-safe delivery system comprising an elastomeric seal and conformably engaging seat for providing direct, unidirectional flow of the material wherein the area of the contact surface of the delivery system to the volume of material passed is minimized to thereby minimize friction, loss of velocity, and to maximize the flow rate of product. The configuration of the seal and seat also completely eliminate the influx of air, airborne pathogens, or any contaminant into the container of flowable medium to which the delivery device is attached. The present delivery system also maintains the integrity and sterility of a flowable material, even when challenged by direct contact through immersion in suspensions of bacteria or viruses. The direct, linear flow path, according to this aspect of the invention, minimizes internal resistance to flow and enables an optimal flow rate and cracking pressure to be provided for various highly viscous substances.

Another aspect of the invention achieves greater control over the internal pressure necessary to overcome the seal; that is, the cracking pressure, and enables the cracking pressure to be optimized to flow both ease of flow or to make flow more difficult when required, such as for safety applications.

In accordance with another aspect of the invention, the delivery device is highly scalable in size and can work even for viscous fluids which are difficult to flow. The present invention effectively delivers materials such as syrups, honey, lubricating greases, petrogels, or other materials, with viscosities ranging from one centipoise to thousands of centipoise.

Another aspect of the invention enables a flowable material to be reformulated without preservatives, antioxidants, and so forth. This provides the advantage of an enhanced therapeutic effect for many medications, especially those which are termed "labile." Such an enhanced therapeutic effect is particularly valuable in eye care solutions. Another aspect of the invention is the configuration of the delivery block or seat which comprises a plurality of vanes extending radially outward from the seat. The vanes provide a direct linear flow path for the delivery of the flowable material. In addition, the seat can be configured to provide an optimized cracking pressure for a particular application. For example, the surfaces of the vanes of the seat which contact the elastomeric seal can be formed in a convex, arcuate shape, thereby imparting a predetermined degree of stress to the conformably fitting elastomeric seal in order to provide enhanced control of flow rate and cracking pressure.

In another aspect of the invention, the sterility of a sterile product such as Ultra High Temperature (UHT) milk, and other dairy products including cheese sauces, cream, and the like can be maintained without the need for refrigeration.

In yet another aspect, the invention regulates unidirectional flow of fluids including gaseous materials such as natural gas. In particular, the invention may be used in applications requiring precise unidirectional control of gas flow. The invention can be used to control precisely the flow of inert gases, such as argon and helium. These and other gases are used in the Chemical Vapor Deposition (CVD) process for fabrication of semiconductor wafers.

In another aspect of the invention, the delivery system can be used to maintain the carbonation of a carbonated flowable medium, such as carbonated soft drinks. beer or the like, even over repeated usage. This has the advantage of prolonging the useful life of a carbonated beverage substantially to that of the beverage's shelf life. In a particular application, the delivery system of the present invention can be used in a public vending machine or soda fountain or the like. Even upon repeated use, this aspect of the invention can protect the delivered product from contamination by molds or yeast. This has valuable application in enabling a beverage, such as a carbonated soft drink to be supplied directly from a vending machine, without the need for separate packaging, such as in aluminum cans, for example. This aspect of the invention has the advantage of saving large amounts of material in packaging beverages, since the beverages now can be delivered safely without any contamination or loss in carbonation. Thus, there would be no advantage to using cans, bottles, or other containers for packaging beverages in a public vending machine or fountain application.

In another aspect of the invention, a molding process using an asymmetric mold design and positioning of the gate in the mold are employed which eliminates knit lines and parting lines from any sealing surface of the delivery system. This process is described in copending U.S. patent application Ser. No. 09/193,264 which is incorporated herein by this reference. All knit lines, parting lines, and flash at the gate are minimized to eliminate their occurrence at seal-seat contact surfaces. This substantially eliminates any imperfections, unconformities, or discontinuities in these contact surfaces. This has the effect of providing a seal, which is substantially impervious to backflow even through direct contact by immersion in suspensions of viruses or bacteria, as will be explained. The present high degree of contamination-free delivery provided by the present invention was not heretofore possible.

Moreover, no validating evidence has been provided that conventional multidose delivery systems can maintain the sterility of their products throughout use. In contrast, the capability of the present invention to maintain the sterility of flowable media challenged by bacteria or viruses is fully validated by experimental data contained herein. Said data were obtained by an independent FDA-approved laboratory.

BRIEF DESCRIPTION OF THE DRAWINGS

These and other features, aspects, and advantages of the present invention will become better understood with regard to the following descriptions, appended claims, and accompanying drawings in which:

DETAILED DESCRIPTION

Conventional Contamination-Free Dispensing Systems

The seats or delivery blocks of conventional systems for dispensing flowable material are shown in FIGS. 1A–1D. For case of description, their elastomeric seals have been omitted. In particular, these figures show the complex flow path which a fluid takes through the seat in order to exit the dispensing system for use. Referring to FIGS. 1A–1D, depending upon the type of valve or delivery system used, a valve 10 includes an entrance port 12 for receiving a flowable material. The arrows indicate the flow path of the flowable material into the entrance port 12 and through the valve 10. Each delivery system also includes an exit port 14. As is well understood by those skilled in the art, a seat is provided with an aperture for receiving the flow path of flowable material and for transferring the material to the exit port 14 in the direction of the arrows shown in FIGS. 1A–1D, respectively. An elastomeric or other deformable seal (not shown) provides a means for closing or opening the flow path for the flowable material to go through the seat, pass between the seat and seal, and exit the outlet port. Note that in FIGS. 1A–1D details of valve operation are omitted in order to show the complex flow path. The flow path of a conventional delivery device typically makes three or four changes in direction, each change slowing, the delivery of the flowable material. Increases in the applied pressure are required. To maintain satisfactory flow rates, several pounds of pressure are required. In addition, the delivery devices, as shown in FIGS. 1A–1D, are not suited to the delivery of viscous materials. Aside from requiring still greater pressures for its delivery, a viscous material may become entrapped in corners or constricted portions of the convoluted flow path and prevent the seal from fully closing.

Other disadvantages arise from the convoluted flow paths of conventional dispensing devices as shown in FIGS. 1A–1D. One disadvantage is the unevenness of flow and lack of control over the flow rate due to the complex flow path. This is particularly troublesome when attempting to deliver highly viscous materials.

Another disadvantage relates to the inability to precisely cut off the flow of a flowable material once the elastomeric member is placed in the closed position. Some of the fluid is retained in the relatively long, tortuous flow path, even after the elastomeric member has been closed. The retained fluid would be subject to contamination, and would in turn contaminate successive doses of fluid. In addition, fluid left in the convoluted flow path would tend to prevent the elastomeric member from seating and closing properly, resulting in leakage as well as providing avenues for the entrance of bacteria, viruses, or other contaminants. This would be detrimental to labile medications, and would allow the entrance of air, causing contamination, oxidation and decreased efficacy of the medication.

Figure 1A:
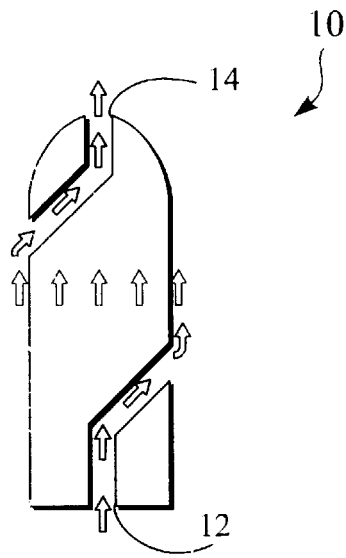
FIGS. 1A–1D are cross-sectional diagrams of typical fluid flow paths through the seats in conventional systems for contamination-free delivery of a flowable material.
Figure 1B:
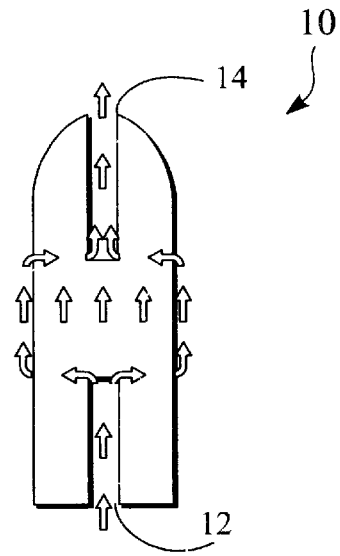
Figure 1C:
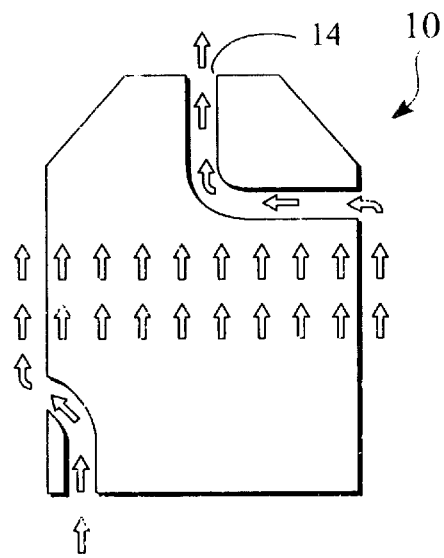
Figure 1D:
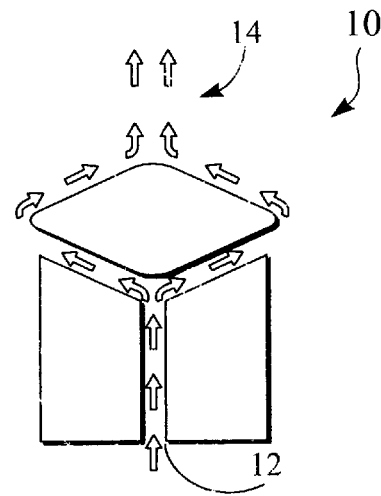
Figure 2:
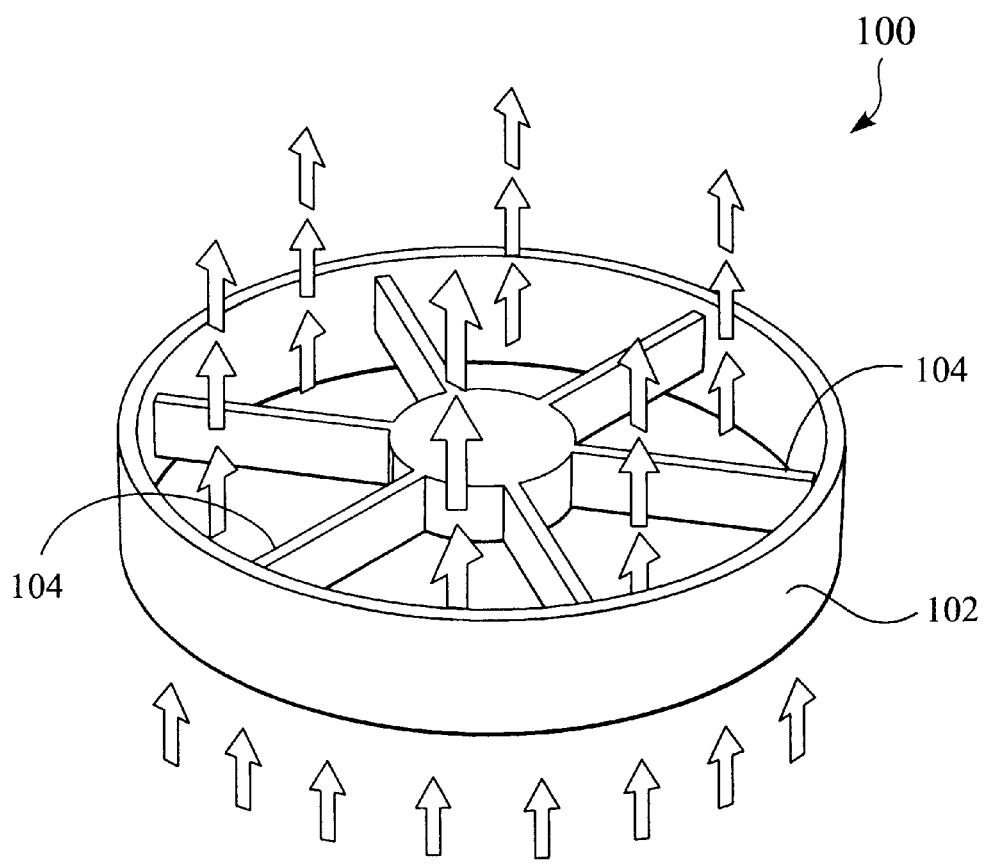
FIG. 2 is a perspective view of a seat for a contamination-free delivery system in accordance with an aspect of the present invention.

Dispensing Assembly For Producing Direct, Laminar Flow With Contamination-Free Operation In accordance with an aspect of the present invention, FIG. 2 shows an improved dispensing assembly seat 100 which is capable of producing direct laminar or linear flow of a flowable material in the direction of the arrows shown. This is a simplified dispensing device which also provides substantially complete and instantaneous truncation of the flow of flowable material once the closure of the device is activated.

In FIG. 2, a dispensing assembly 200 comprises a seat 100, a seal 110 and a housing 120. The seat 100 comprises a plurality of vanes 104. The vanes are axially arranged around a central blocking portion 106. A peripheral surface 102 of seat 100 defines a direct, linear flow path for the flowable material. That is, the peripheral surface of the seat constrains the flowable material to assume a tube of flow.

It will be appreciated that the vanes 104 each have a major surface for defining the flow path. Each vane 104 extends radially outward from a center blocking portion of the seat. When the seat 100 is in the open position, the flowable material is directed by the vanes 104 in substantially direct fashion through the seal 110 and out of the exit port 122 in the housing 120 (see FIG. 3). The vanes 104 help to ensure that the flowable material retains a substantially linear tube of flow through the entire dispensing assembly.

The vanes 104 could also be viewed as sectors which impart unidirectional laminar flow to the flowable material. An equivalent structure for the seat would comprise a series of parallel channels for constraining a tube of flow through the seat. In this case, the blocking portion would comprise the space between the channels.

It is understood that the seat can comprise but a single vane. Alternatively, the seat 100 may be described as a tube having a peripheral surface 102. The blocking portion 106 need not be centrally located as shown. What is important is that the peripheral surface 102 of the seat 100 must constrain the flowable material to assure a tube of flow through the seat. A tube of flow may be defined as a flow path comprising a series of flow vectors or streamlines. Turbulent flow is eliminated.

As will be explained in greater detail infra, the peripheral surface 102 of the seat 100 and bore 112 of the adjacent seal 110 constrain the flow path so that flow can be effected substantially without separation of a boundary layer sufficiently downstream of the seal 110 and exit port 122 such that no reverse flow or reflux occurs and no air or external contaminants can return through the exit port 122. The tube of flow reduces the volume of a boundary layer in the seat and bore of the seal to a point which is insufficient for the motility of microorganisms.

Figure 3:
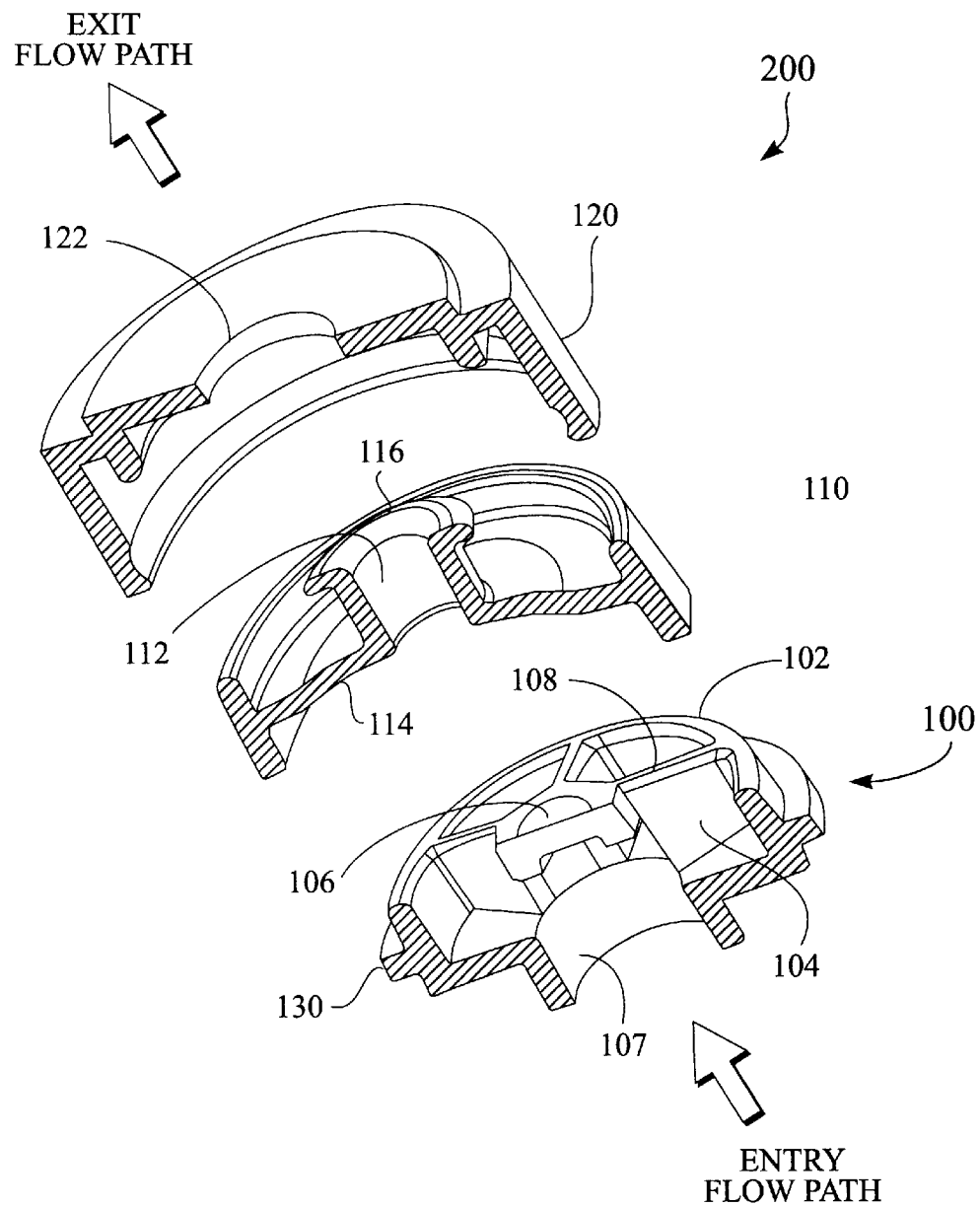
FIG. 3 is an exploded view and cross-section of a device for contamination-free delivery in accordance with an aspect of the present invention.

It is understood that in FIGS. 2 and 3, the entrance to the seat is connected to a container of flowable material. The seat also may be integrally formed in the neck or outlet end of a container of flowable material.

In operation the vanes 104 of the seat each has a major surface which is parallel to the flow path of the flowable material. The vanes extend outward radially to the peripheral surface of the seat and impart strength to the seat. The vanes minimize resistance to flow and direct the flow path of the flowable material in a substantially constant uniform direction through the seal and through the outlet port 122. In contrast to conventional devices, the flow path of the flowable material remains direct and linear between an inlet or entrance port 107 of the seat 100 and the outlet port 122 of the housing 120. The vanes ensure the linear flow of the fluid, such that internal resistance to flow is minimized. Also, the volume of a boundary layer is reduced or substantially eliminated so as to be insufficient for the motility of microorganisms.

In accordance with an aspect of the invention, the geometry of the vanes 104 also can be designed to provide an optimized cracking pressure for the release of fluid. That is, the top surface or seal contacting edges 108 of the vanes also define the shape of the surface of the seat which contacts the elastomeric seal. The locus of all seal contacting surfaces of the seat impart a predetermined shape to the seal when the seal and seat are locked together in a seal tight engagement. This shape can be varied in order to impart a predetermined stress or pressure on the elastomeric seal. The shape of the vanes and surface of the seat in contact with the seal can be changed to provide an optimized cracking pressure for the release of flowable material. Cracking pressure is the activation threshold pressure at which point the fluid flows through the entrance port and central bore of the seal. It will be appreciated that the ability to control the pressure placed upon the seal by the geometry of the seat conformably contacting the seal is a major factor in ensuring that the flow of the material through the dispensing assembly can be precisely controlled to a greater degree than was heretofore possible. The flow remains, at all times, direct and laminar and once the seal is closed, flow is instantaneously and completely cut off and there are no spaces where excess flowable material could be concentrated to contaminate successive releases of fluid or provide avenues for air or for microorganisms to enter the dispensing assembly.

A seal 110 is provided for conformably contacting the seat 100 at a sealing surface 114. The seal has a bore 112 for admitting flowable material from the seat. The bore 112 is coextensive with or smaller than the blocking portion 106 of seat 100. The bore 112 is coaxially aligned with the blocking portion of the seat for enabling unidirectional flow through the bore and out to exit orifice or outlet 116 which is disposed in exit port 122 of housing 120 when the seal 110 and seat 100 are in an open state.

Referring to FIG. 3, the seal comprises a reversibly deformable elastomeric material which contains a bore to admit a tube of flow from the seat. The seal is designed such that the bore conformably contacts the blocking portion of the seat in a first or closed position (shown in FIG. 4). In the closed position, the arcuate shape of the top of the seat (produced by the locus or seal contacting surfaces of the seat) imparts a pressure to the elastomeric material of the sheath and ensures a seal-tight, closed position in which pressure from the elastomeric sheath is constantly exerted against the seat. In a closed position, the pressure exerted by the elastomeric sheath prevents the flow of any material from the seat.

The seal and seat cooperate to provide two states for the dispensing assembly. In a first or closed state (shown in FIG. 4), the exit port in the seal is blocked by a solid portion of the seat, wherein the seal is held strongly against the seat, either by pressure produced by the elastomeric material against the arcuate shape of the seat, or by an internal pressure from the flowable material (when the seat is disposed downstream in the flow path from the seal). In a second state (shown in FIG. 5), the seal is separated from the seat, either by a negative pressure such as by pulling or pushing the seal or by increasing the internal pressure of the fluid or by applying pressure to the fluid reservoir.

It will be appreciated that the sealing surface 114 between the seal and seat is greatly facilitated by having smooth mating surfaces for the seal, the solid part of the seat and in some cases, the housing. Please refer to U.S. patent application Ser. No. 09/193,264, incorporated by reference herein. This requires the following special care in the design of the molds and choice of the processing parameters for manufacture of the component parts:

(1) An asymmetric mold is used so the mold parting lines occur outside critical surfaces of the molded parts. (2) In addition, gates that could leave "flash", are placed in regions where critical defect-free surfaces are unnecessary. (3) On preparing, molds, certain critical surfaces are highly polished approximating the finish of a diamond. (4) Process parameters are selected and monitored to minimize the occurrence of knit lines due to the confluence of plastic flow fronts as they fill the mold and may solidify too quickly. Consequently, parts made from these molds have functional sealing surfaces that are very smooth and conformably mate and separate during the reversible transition between closed and open states. This substantially eliminates any unconformities or air gaps which either could trap microorganisms, retain fluid that could impair sealing of the device or provide an avenue for leakage or backflow contamination.

A further aspect of the invention is that the durometer of the elastomeric seal is variable and can be selected to directly increase the pressure exerted by the combination of the seal and seat against the flowable material. The durometer in accordance with this aspect of the present invention can be much higher than is disclosed in conventional systems.

Figure 4:
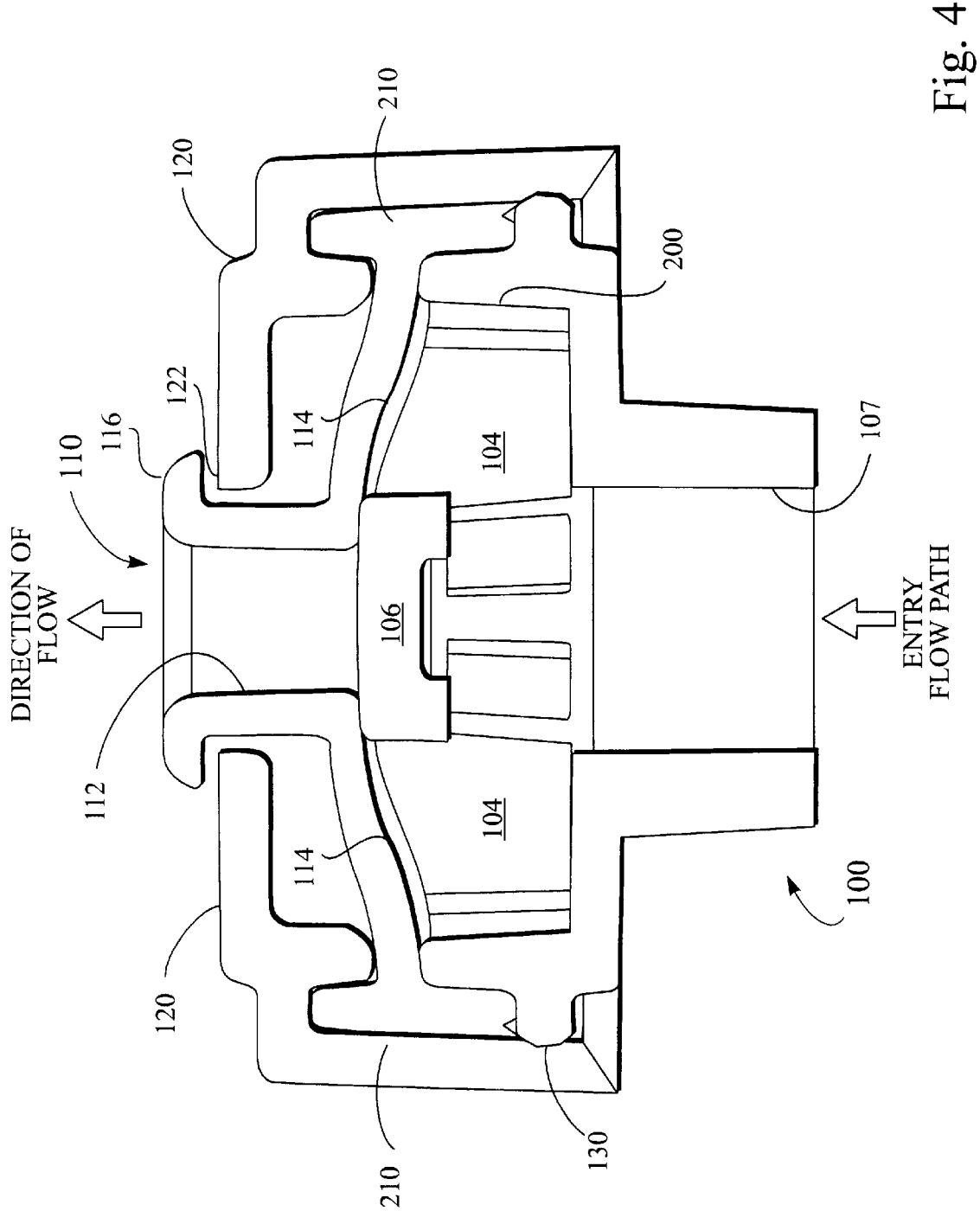
FIG. 4 shows a cross section of a delivery system in a closed position in accordance with an aspect of the present invention.
Figure 5:
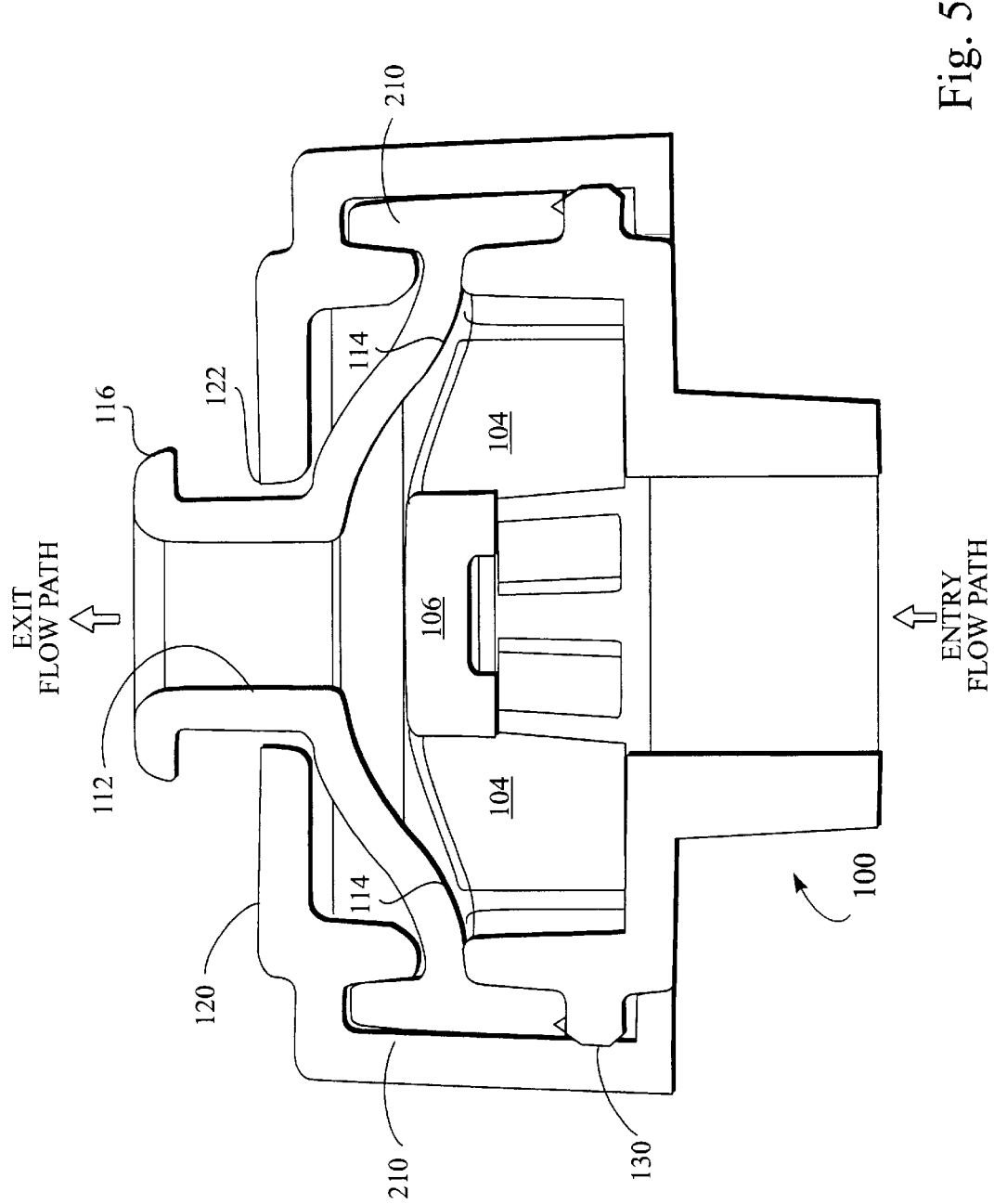
FIG. 5 shows a cross-sectional diagram of a fluid delivery system.

This is made possible by the geometry of the seal and the strong engagement between the housing 120 and seat 100 which anchors the seal 110 in place. The seal further comprises a reinforced annular portion 116 disposed about the exit of the bore 112. The reinforced annular portion 116 fits over the exit port 122 of the housing 120 as shown in FIGS. 4 and 5.

The periphery of the seal 110 is also reinforced and widened along the longitudinal axis to provide a rim to conformably engage and fit into a complimentary annular recess 124 in housing 120. The periphery or rim of the seal also conformably fits over the peripheral surface 102 of the seat to completely constrain the flow path of flowable material from the seat and to direct the flowable material through the bore 112 and out the outlet 116.

The outer periphery of the seat 100 also includes a reinforced portion 130 for mating against the reinforced periphery or rim of the seal 110.

This geometry provides a strong engagement for anchoring of the seal and enables a repeatable transient-free response of the seal to transition between an open and closed position with respect to the seat. This also enables the durometer of the seal to be greatly increased in comparison with conventional devices and to eliminate jitter and uneven closure.

For example, U.S. Pat. No. 5,305,785 sets a maximum upper limit of durometer as 70 A. Also, a preferred range of durometer in this conventional dispensing system is in a range of 25–55 A (column 3, lines 24–27). The limited range of durometers disclosed in conventional dispensing devices precludes their use in high pressure applications such as for carbonated beverages, safety devices and the like. Further, the limited durometer of conventional devices is a factor in limiting the response and effectiveness of their seals. This contributes to the entrapment of fluid between the elastomeric seal and delivery block, thereby serving as a contamination source.

Referring to FIGS. 4 and 5, the dispensing apparatus according to an aspect of the present invention, is shown in a closed state and an open state, respectively. This particular embodiment is suitable for attachment to or integration into the neck of a volumetrically reducible container holding a quantity of flowable material.

In FIG. 4, the seal 110 is held tightly and conformably against the solid portion of the seat 100. The sealing surfaces 114 between the seal and seat contain imperfections less than 5 $\mu$m (microns) in height and depth. The molds used to fabricate the seal 110 and seat 100 are highly polished, particularly where the molds form functional or sealing surfaces of the seal 110 and seat 100 and, when used, the housing 120. This has the advantage of eliminating any unconformities, defects, or air pockets which either could trap or provide an entry for microorganisms or leakage of the device.

All parting lines and knit lines are carefully kept out of the flow path. Thus, as shown in FIG. 4, the seal 110 and seat 100 are pressed conformably against one another in a seal-tight arrangement at sealing surface 114 thereby substantially eliminating the occurrence of unconformities or air pockets.

The upper edge of the vanes 104 which contact the seal 110 at sealing surface 114 can be shaped to exert a specified pressure against the elastomeric seal in order to provide an optimized cracking pressure or discharging a viscous material. The optimized cracking pressure can be selected to provide ease of flow. In the case where the viscous material is difficult to flow, the locus of all the seal-contacting edges of the vanes at sealing surface 114 and blocking portion 106 of the seat may be configured to exert a specific pressure against the elastomeric seal, thereby ensuring, that a minimum application of external pressure would be sufficient to activate the cracking pressure of the viscous material, and remove the seal from the seat. At the same time, the vanes 104 provide a unidirectional laminar flow of the material through the seat and bore 112 fo the seal.

The geometry of the vanes 104 and blocking portion 106, which form an arcuate sealing surface 114, could be varied so as to impart a predetermined pressure against the seal 110. In so doing, the flow of a viscous material can be reduced. i.e., made more difficult to provide safety factors, as required for childproof tubes and so forth.

Referring to FIG. 4, a seat 100 comprises a solid or blocking portion 106 and a peripheral surface 200 for constraining a flow path to assume a tube of flow. Peripheral surface 200 can be coextensive with bore 107. A reversibly deformable seal 110 is provided with a thickly reinforced, extended rim 210. The rim 210 is strongly anchored between housing 120 and a reinforced outer portion 130 of the seat 100. The reversibly deformable seal is characterized by a memory effect and is responsive to an applied positive or negative pressure for transitioning between a closed position with respect to the seat (FIG. 4) and an open position with respect to the seat (FIG. 5). The seal comprises a bore 112 including an outlet orifice 116. The bore is coaxially aligned with the blocking portion of the seat for enabling the tube of flow path from seat in the open position and for blocking the tube of flow in the closed position. The seal bore and sealing surface 114 are disposed for airtight engagement against the seat along sealing surface 114 which completely blocks flow in the closed position.

In an aspect of the invention, the transition from the open to closed position is characterized by a contraction of the seal 110 from the periphery in rim 210 toward the center of bore 112 along the sealing surface 114. This strong contraction in the transition to the closed state is believed to generate an impulse wave which expels residual flowable material sufficiently downstream from the exit orifice 116 so as to completely eliminate reflux or backflow. The impulse wave also expels any film or boundary layer on the inner surface of bore 112.

All flowable materials have cohesion and adhesion properties and forms of molecular attraction. Generally, the more viscous the fluid, the more pronounced are these affects. These properties create capabilities known as surface tension and capillarity. A flowable material will wet at a surface with which it contacts and under static conditions leave a small film of said material. Although surface tension effects are generally negligible in most engineering situations, they are important in the formation of drops and bubbles, the breakup of liquid films and in small mechanisms. These effects are the primary transport mechanism for contamination as these films or residues left in conventional small valve nozzle areas can provide a transport mechanism for microbes to contact film and migrate upstream of the seal. Accordingly, an aspect of this invention provides a mechanism that expels all the film trapped in the valve during transition from an open to closed state. Any remaining fluid material is arrested at the sealing surface 114 between the seal and seat and provides a barrier to any transport mechanism for contamination of the reservoir material. Any remaining matter is then flushed out upon the next use. Thus, residual flowable material which is arrested or entrapped at the sealing surface 114 between the seal and seat apparently is limited to one or more molecular layers which form a barrier to the entry of air and are insufficient to support the motility of microorganisms upstream of the sealing surface. Thus, repeatable non-contaminated doses can be administered without adding contaminated residue.

Figure 6:
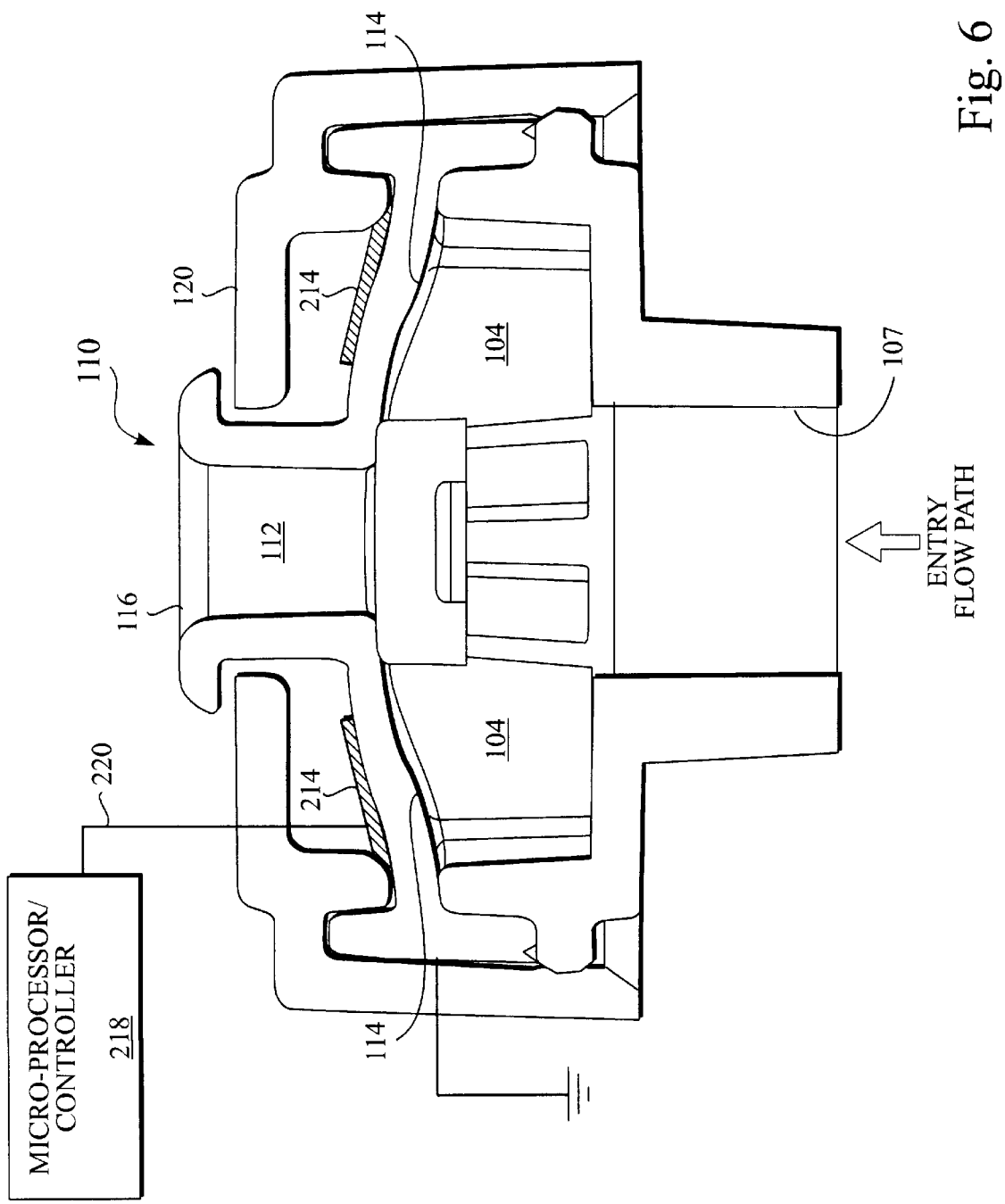
FIG. 6 shows a cross-sectional diagram of a seal comprising a shape memory material in a closed position in accordance with an aspect of the invention.

In an embodiment shown in FIG. 6, the reversibly deformable seal 110 comprises a shape memory material such as a Titanium Nickel alloy (TiNi) or the like, characterized by a memory effect. The transition of a shape memory material from a first state to a second state at an activation threshold temperature is well known. As is well understood by those skilled in the art, a means for effecting the phase transformation of the shape memory material commonly comprises applying an electric current to a resistive heating means for heating the shape memory material to a phase activation threshold. However, the means for effecting a phase transformation need not be limited to an electric current, but rather can be any energy field sufficient to induce a phase transition of the shape memory material. Resistive heating means 214 are provided on the downstream side of sealing surface 114. A microprocessor/controller 218 is connected for providing a threshold activation current to resistive heating means 214 over lead 220 in accordance with techniques which are well known. Resistive heating means also could be provided in the seat, at any convenient surface portion of the seat which contacts the seal at sealing surface 114. In this case, the microprocessor controller would provide a threshold activation current to the seat in accordance with techniques which are well known. The seal contacting portion of the seat is used to resistively be at the seal to its activation threshold and move the seal to an open position. The temperature of the flowable material moving through seat 100 or bore 112 of the seal 110 would determine the speed of the transformation back to the closed state. This process could be used for providing a precisely controlled metered delivery of flowable material.

The reversible transformation of the seal comprising a shape memory material would still take place along the angled sealing surface 114 and thus provide a phased closure or concentric contraction toward the bore to provide the self-cleansing sealing effect described above.

It will be appreciated that the durometer of the seal, in combination with the geometry of the seal-contacting surfaces of the vanes and blocking portion of the seat, can be configured so as to provide a strong restorative force to the seal sufficient to clear the flow path of product, even viscous material. This provides a strong locking seal-tight engagement that is stronger than is possible in conventional devices. This restorative force automatically truncates the flow of a flowable material. The application rate of a flowable medium, such as viscous medication or the like, is enhanced while the entry of external contaminants is prevented. It will be appreciated that the geometry and cooperation of the seal and seat, in combination with the engineering parameters used to fabricate the seal and seat, serve to eliminate any unconformities in the flow path. This aspect of the present invention is effective in preventing contamination, even upon direct immersion of a system in viral or bacterial solutions, as will be explained.

It will also be appreciated that an aspect of the present invention eliminates dead volume in applying viscous substances from a conventional squeeze tube. For example, more than 98% of the viscous material can be delivered from a tube in a substantially constant and uniform manner, due to the complete elimination of reflux, backflow, or entry of air. In addition, the contents of the tube can be used substantially indefinitely without their degradation. Accordingly, the contents of the tube can be reformulated without preservatives or other additives. This is especially valuable for pharmaceutical products, such as salves and ointments.

In addition, the apparatus, according to this aspect of the invention, can be scaled up or down in size to accommodate extremely large or extremely small volumes of flowable material. In all cases, the geometry of the seat, including the vane or vanes ensures that the flow path remains linear and that internal resistance to flow is minimized. This also enables flow to be truncated cleanly, providing a sanitary feature. No excess material remains to provide avenues for entry of any contaminants.

Figure 7:
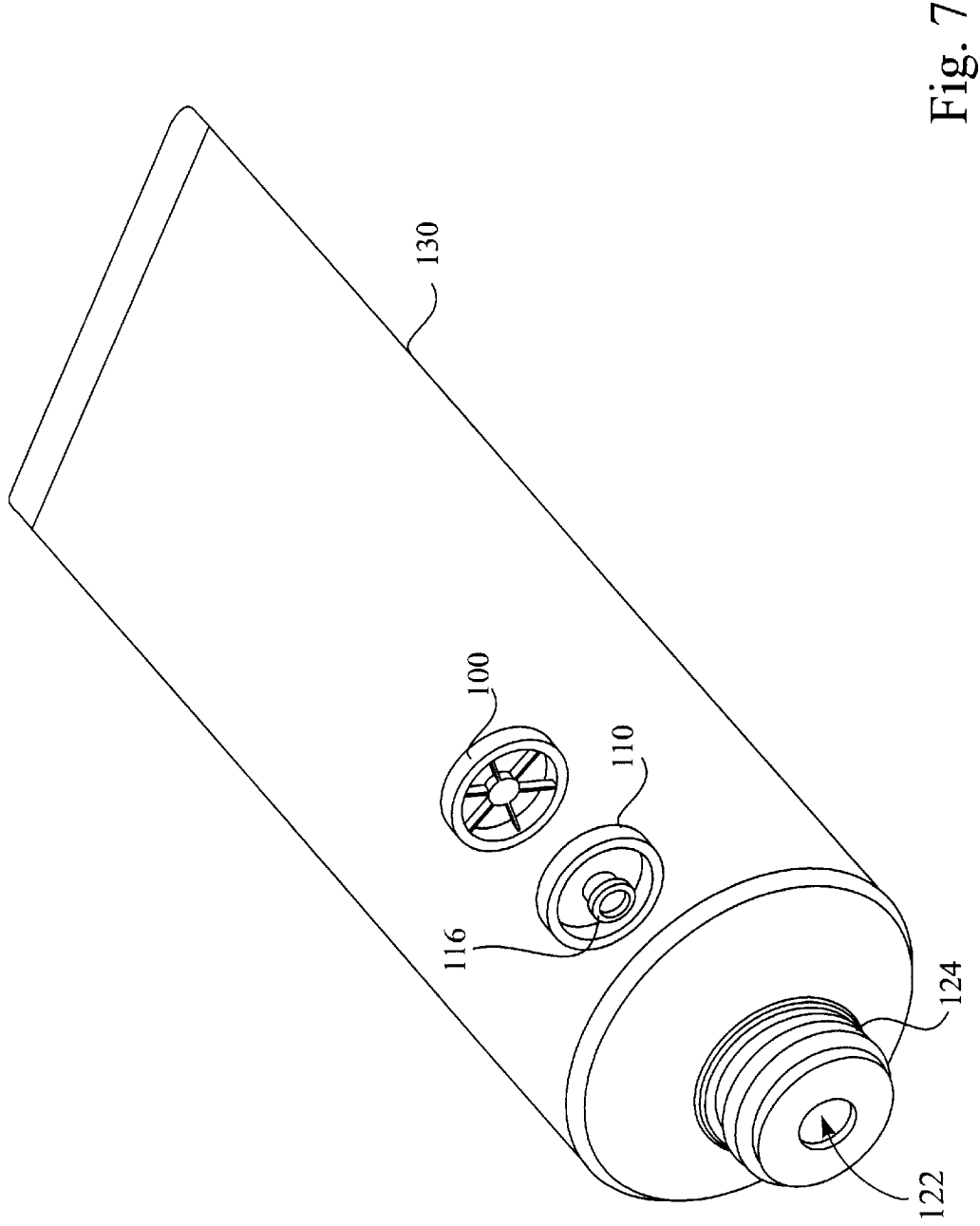
FIG. 7 shows an exploded perspective diagram of a delivery system incorporated in a tube for delivering a fluid, including, a flowable viscous material in accordance with an aspect of the invention.

FIG. 7 is an exploded view that shows an application of the dispensing device within a volumetrically reducible container for dispensing a fluid material. This application would work for materials having viscosities extended up to many thousands of centipoise, such as honey, grease, caulking agents, paints, varnishes, or the like.

Application of pressure on the seal displaces the seal from engagement with the seat and allows flow of material between the seat and the seal and out the exit port. Thus, the seal and seat cooperate to provide two states. In a first state, the exit port in the seal is completely blocked by a solid central blocking portion of the seat (shown in FIG. 4). In a second state, the application of pressure on the seal opens the seal and allows fluid to flow (see FIG. 5).

Figure 10:
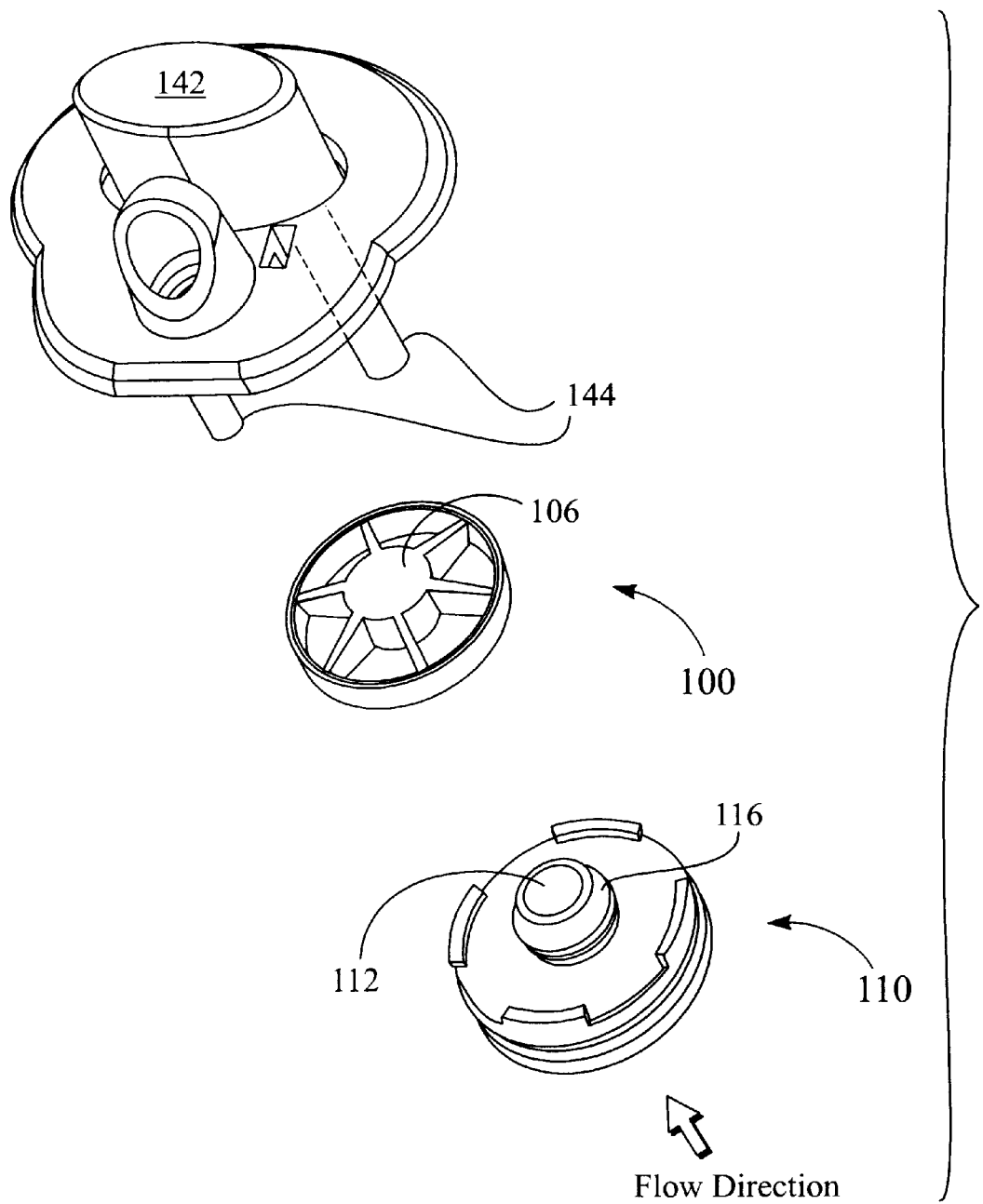
FIG. 10 is an exploded perspective view of an embodiment of an actuator, seat and seal for carbonated beverages in accordance with an aspect of the present invention.

It will be appreciated that the seal also can be placed upstream in the flow path, between the seat and the container of flowable materials shown in FIG. 10. For example, with a carbonated beverage such as soda or beer, the internal pressure of the flowable material would provide the restorative force for sealing the seal strongly against the seat. In this arrangement, the carbonation of a flowable material could be maintained for a period substantially equivalent to the shelf life of that material.

Referring to FIG. 7, the internal pressure on the fluid is increased by compression on the walls of a flexible container by reducing the volume of the container or by other well known means. This pressure forces the elastomeric seal 110 from its conformable position on the seat 100. As previously explained, the durometer of the seal 110 is adjusted to optimize the cracking pressure or activation threshold at which fluid flow occurs. Alternatively, the optimized cracking pressure can be increased for safety considerations.

Note that for this embodiment, the seat 100 is in direct contact with the fluid and is disposed upstream in the flow path relative to the seal 110. In this case, a housing for holding the seat 100 and seal 110 in conformable locking engagement is provided by the interior surface of the neck 124 of the volumetrically reducible container or tube 130. Either the seal or seat may be integrally fabricated with the neck of the container. It will be appreciated that this provides a volumetrically reducible container of substantially two components which is simple and cost effective to manufacture, while at the same time, providing a substantially complete protection against airborne contamination or contamination by direct contact with viruses or bacteria. This provides a heretofore unattainable seal which enables the integrity of the flowable material to be maintained throughout its use, in many cases attaining the shelf life of the flowable material. This also enables a labile medication to be formulated without antimicrobial agents or other additives, and thus greatly enhance the medication's therapeutic effect eliminating side effects of these additives. The use life of preservative-free thermostable flowable materials can be extended to their shelf life without requiring refrigeration. It should be worth noting that nearly 70% of the world's population presently has no access to refrigeration.

Figure 8:
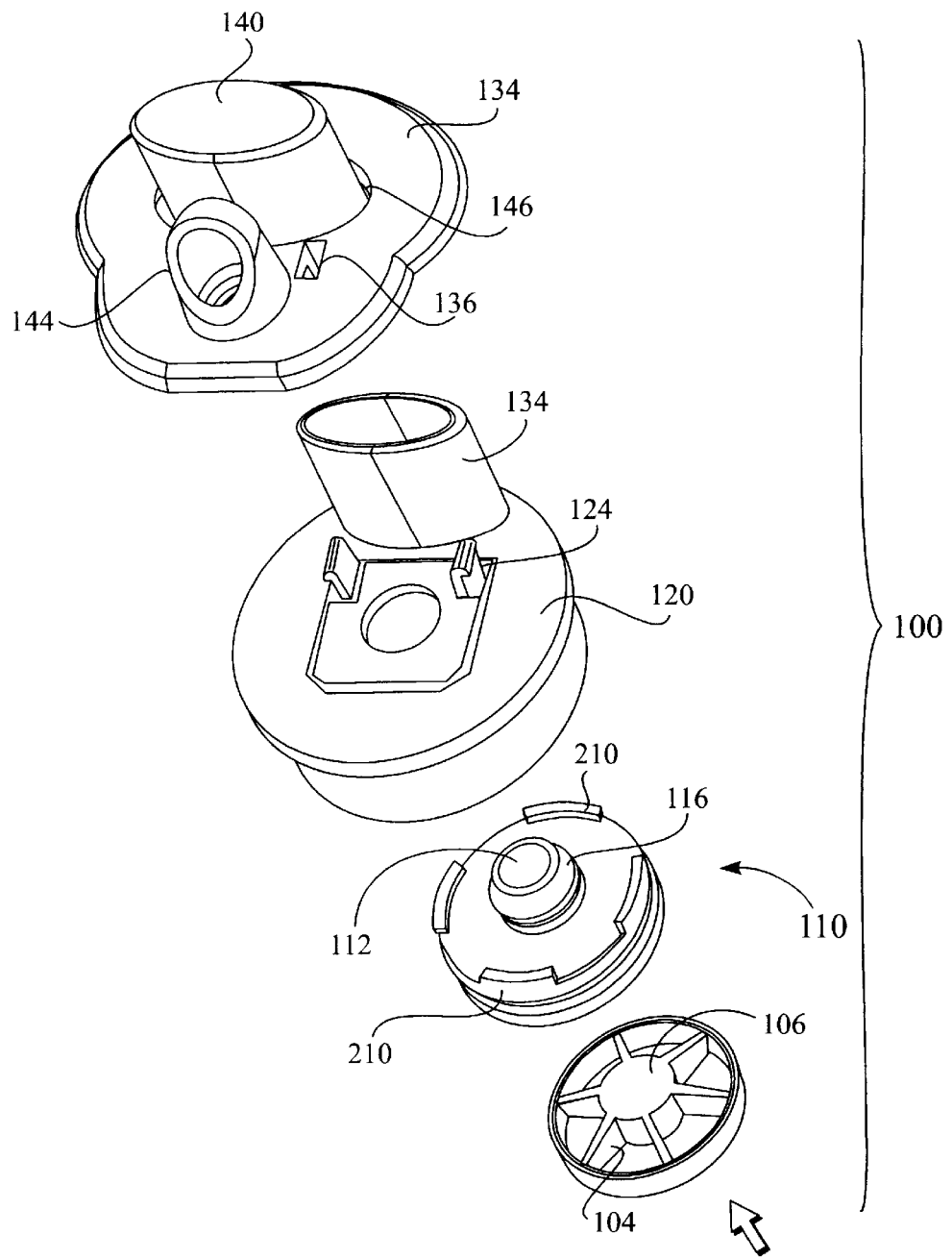
FIG. 8 is a perspective view of a seal, seat and actuator in accordance with an aspect of the present invention.

FIG. 8 shows an exploded view of an embodiment including a housing 120 and integral lever 134 for effecting the transition between closed and open states of the seal 110 and seat 100. In this particular embodiment, a housing 120 is provided for holding the seal 110 and seat 100 in operational engagement. It will be appreciated that the seal 110 also may be tethered in operational engagement with the seat 100 or maintained in operational engagement by other well known means for allowing a transition between a closed and open state of the seal 110 and seat 100. The seal 110 is shown downstream from the housing 120 with respect to the flow path of the material. The central bore 112 of seal 110 is disposed for locking engagement with the central blocking portion 106 of seat 100, when in an enclosed position. The seal 110 is provided with a reinforced portion 210 located at its periphery for assisting the seal 110 in returning to the closed state. Another reversibly deformable reinforced portion 116 is disposed around the outlet bore 112 of the seal 110 for engagement with the housing 120 and actuator 134. Actuator 134 contains lever 140 and includes delivery spout 144 or other means for directing the flow once it exits the bore 112. Lever 140 pulls the seal 110 off the blocking portion 106 of the seat 1001, thereby enabling fluid to flow directly through the vanes 104 in the seat 100 and out the central bore 112 of the seal 110. A housing 120 is provided for protecting the seal 110. It will be appreciated that in an open position the flow path of the fluid material is directed by the radially-disposed vanes 104 of the seat 100 into a linear, direct flow that is coaxial and unidirectional with the bore 112 of seal 110.

Figure 9:
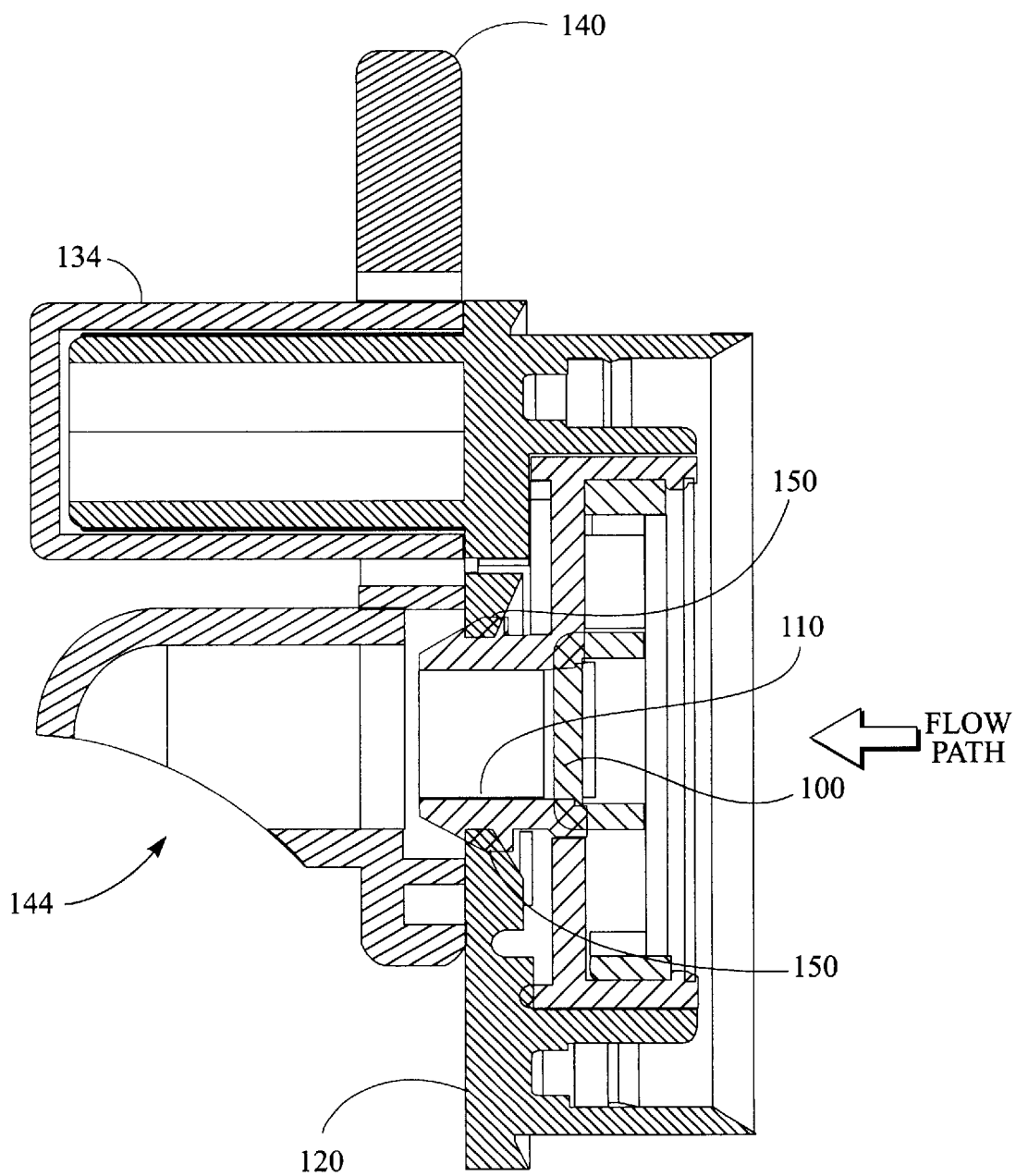
FIG. 9 is a cross-sectional view of the embodiment of FIG. 8.

In FIGS. 8 and 9, an actuator 134 integral with a housing 120 provides a means for moving the seal 110 and seat 100 between a first closed state and a second open state. The housing 120 also provides an enclosure for maintaining the seal 110 and seat 100 in operational engagement.

This embodiment minimizes the surface area of the seal 110 and seat 100 in contact with the flow path, while providing a unidirectional, linear, high volume flow in an open state. Actuator 134 is attached to lever 140 and housing 120 such that the mounting tabs 124 shown on the housing 120 penetrate channels 136 on actuator 134 and snap in place to attach the housing 120 to the actuator 134. The lever 140 includes projections 150 on its under surface for pulling the seal 110 away from the seat 100 to effect fluid flow. (FIG. 9).

The lever 140 also can include tamper evident tabs 146 molded to the lever 140. Upon the first use, the tabs 146 break away from lever 140. When the tabs are affixed, this clearly indicates to a user that the dispensing system has not been tampered with or used.

FIG. 10 shows an alternate embodiment for maintaining the carbonation of a flowable medium without degradation over time. The seat 100 is located downstream of the seal 110, and would lie adjacent to an actuator 134. A typical actuator contains a pushbutton 142 disposed for reversibly moving the seal-seat engagement from a closed to open position. A typical actuator is fitted with projections (144) on an end thereof. On depression of the pushbutton 142, the projections 144 move through the apertures located in vanes or periphery of the seat 100 and deflect the seal 110 for transition between closed and open states.

Figure 11:
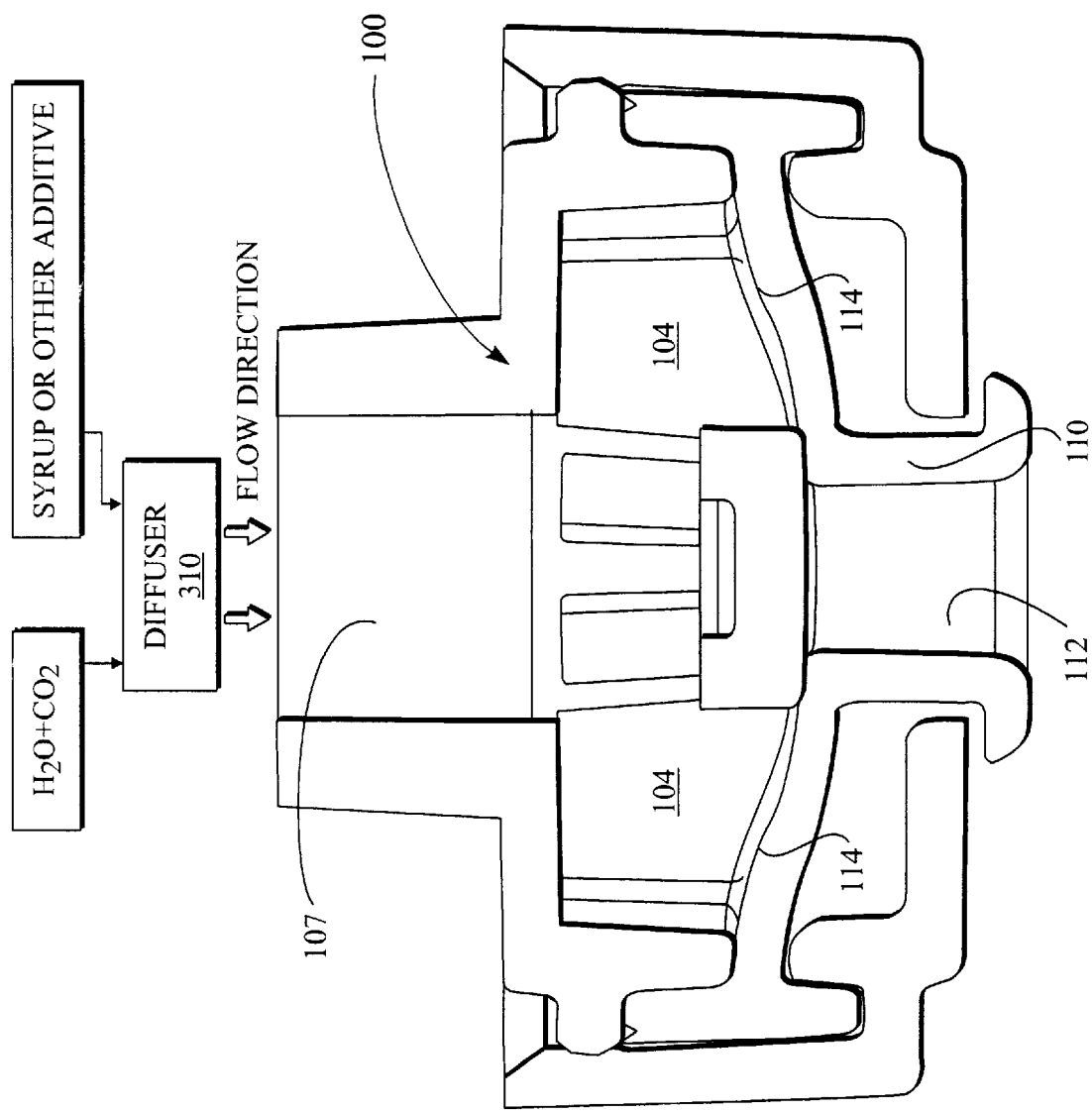
FIG. 11 is a diagram showing a delivery system incorporated in a soda fountain or the like for dispensing a flowable material in accordance with an aspect of the present invention.

In FIG. 11, a delivery system in accordance with an aspect of the present invention is provided for dispensing a flowable material, such as a soft drink or other beverage from a fountain or vending machine. As is well known, the beverage fountain contains a diffuser unit 310 through which beverage components such as water, flavored syrup and carbon dioxide gas, or similar ingredients flow to be mixed and dispensed to the inlet 107 side of a seat 100 as previously described. The seat 100 and the seal 110 reversibly transition between an open and closed state at sealing surface 114. As previously described, the transition to the closed state creates a self-cleaning impulse wave which expels flowable material, including, any film or boundary layer out of the bore 112. At the same time, the flow of the material through the seat 100 is truncated at sealing surface 114. Any residual flowable material is entrapped at the scaling surface 114 and forms a monolayer barrier to the entry of air or any external contaminants. It will be appreciated that this aspect of the invention prevents any contamination whatsoever of the flowable material upstream of the dispensing system.

The contamination-safe dispensing system, in accordance with the above aspects of the present invention, can be located downstream from and immediately adjacent to a diffuser system. A diffuser system, wherein a syrup or other additive is mixed with a beverage, can be integrated into the present dispensing system. The integrated dispensing system would enable the flowable media to be mixed in a protected environment. The beverage components would be kept completely safe from any airborne or other type of contamination or breakdown. This advantageously would enable reformulation without preservatives, additives, or other agents while extending the product's useful life. Thus, such a device would ensure improved purity of a flowable material over what is presently possible.

The molding process parameters will vary depending on the materials, size of the parts, and specific features of the molding machine. However, in all cases these processing parameters should be chosen to minimize flaws, such as of flow and knit lines. In addition, the mold should be designed so that parting lines and flash at the gate do not occur on functional sealing surfaces of the molded parts. The specific process and mold design parameters are well known to one skilled in the art, and can be readily duplicated without undue experimentation.

The seal, seat, housing and actuator component parts are made preferably of moldable materials. The seal can be made from various thermoplastic elastomeric materials, such as silicones, styrene-butadiene-styrene block copolymers, polyurethanes, rubber, and the like. It also can be made from a shape memory material such as TiNi. The seat, housing, and actuator can be made of thermoplastic or thermosetting resins. Exemplary materials include high and low density polyethylene. polyvinyl chloride, Barex®, polypropylene, polystyrene, polycarbonate, polyesters, poly (methylmethacrylate), carbon composites, and the like.

The dispensing and delivery system provided by the present invention advantageously protect flowable materials from the adverse effects of evaporation, oxidation, and hydrolysis. The present dispensing, and delivery system advantageously prohibits the entry of the following contaminants into a flowable medium contained within the dispensing and delivery system: (1) microorganisms, such as protozoa, yeast, molds, bacteria, and viruses, (2) air and any of its constituent parts, such as nitrogen, oxygen, carbon dioxide, and water; (3) dust, smoke, pollen, and filamentous or other particulates; (4) airborne or bloodborne pathogens, such as, for example, the HIV or Hepatitis-B virus; or (5) the evaporation or breakdown of the flowable medium by one or more of its constituents.

The dispensing and delivery system, according to the present invention, advantageously eliminates the need for filters, antimicrobial preservatives, antioxidants, hygroscopic agents and, in some cases, the need for refrigeration. This has the advantage of providing for substantial benefits in increased purity of the flowable material, the ability to maintain sterility of the material over its entire useful life, ease of formulation of the flowable material without the need for preservatives, antimicrobial agents, and so forth, reduction in shipping and storage costs and a reduction in damaging or harmful side reactions.

It will be appreciated that the present dispensing and delivery system also has the advantage of maintaining the sterility and integrity of a flowable medium contained within the system. This effectively prolongs the useful life of the flowable medium to that of the shelf life. This also permits the distribution of a flowable medium in larger sized containers without the need for refrigeration, thereby permitting a reduction in cost per unit volume of the fluid and an economy of scale and decreased shipping and storage costs.

The foregoing advantages of the present delivery and dispensing system were proved in laboratory testing. The effectiveness of the present dispensing and delivery system against viral and bacterial challenges are set forth in the following two examples.

EXAMPLE 1

Viral Challenge Testing with ΦX714 Bacteriophage [Laboratory No. 131127]

This example describes test details for the viral challenge of Waterfall's MicroBarrier™ technology when used in a multidose system for the dispensing and delivery of aqueous or viscous flowable materials. The system is designed to allow delivery of multiple doses of viscous fluids over prolonged periods of time, while preventing the influx of external contaminants.

Microbiological evaluation was conducted by attaching each of the following to one of the three ports of a three-way stopcock with luer lock fittings: a 60 mL syringe (the media reservoir), a MicroBarrier™ Cartridge (Model #WFLE2aVIS 97-60A, and a 3 mL syringe (for sampling the reservoir). The reservoir syringe was filled with sterile soybean casein digest broth containing corn starch (SCDBC). Corn starch was added to increase the viscosity of the growth media. To simulate use, an aliquot of sterile SCDBC was dispensed each day through the test cartridge. Additionally, the tip of the cartridge was contaminated by dipping it into a concentrated suspension of virus. The test unit was allowed to incubate at room temperature between daily contaminations. The challenge virus used in this study was bacteriophage ΦX174, prepared at a concentration of approximately $10^8$ plaque forming units per mL (PFU/mL).

Each day, an aliquot of the fluid in the reservoir syringe was collected in the sampling syringe and assayed for the presence of the test organism. The study was conducted for 21 days. The results were scored as "positive" if the challenge organism was detected in the assay fluid, and "negative" if not. The study evaluated 30 sample cartridges. Three positive and ten negative controls were also included in the study. A growth promotion control was done to ensure that the media were capable of sustaining the challenge organism.

Cartridge Preparation

Prior to testing, the cartridges were sterilized using ethylene oxide gas. Ethylene oxide sterilization was performed according to the following parameters:

Preconditioning: 60 minutes minimum.

Temperature: 54±2° C.

Relative Humidity: 55±10%.

Gas Concentration: 600±30 mg/liter.

Exposure Time: 4–5 hours.

Degassing Time: 48 hours minimum at 55±2° C.

Challenge Preparation

Approximately 100 mL of nutrient broth was inoculated with E. coli and incubated at 37±2° C. with rapid shaking [200–250 RPM for approximately 6–18 ours to prepare the ΦX174 bacteriophage. A 1/100 dilution of the culture was prepared and incubated at 37±2° C. The culture was allowed to grow to a cell density of ≈2–4×$10^8$ CFU/mL [about 3 hours]. This cell density has a corresponding optical density of 0.3–0.5 when viewed spectrophotometrically at 640 nm. The bacterial culture was inoculated with 5–10 mL of the ΦX174 bacteriophage stock [ATCC #13706-B1]. The ratio of bacteriophage to bacterial cells was between 0.1 to 2.0. The suspension was incubated with rapid shaking for approximately 1 to 5 hours at 37±2° C. Complete lysis of the host bacteria was noted when the broth cleared. The virus suspension was centrifuged at 10,000×G for at least 20 minutes. The supernatant fluid was filtered through a sterile 0.22 μm filter to remove the host cell debris. The bacteriophage challenge suspension was prepared by diluting the phage stock in sterile nutrient broth. The titer of the culture was determined for each day of testing.

Medium Preparation

Corn starch was added to SCDB (SCDBC) to achieve a viscosity of 1,600 to 2,400 cP at 21±2° C. The mixture was heated with constant stirring to boiling. The medium was sterilized according to normal laboratory procedures. The viscosity of the medium was measured at room temperature (21±2° C.) to ensure that it was within the acceptable range.

Assay Procedure

A sterile 60 mL syringe was aseptically filled with SCDBC. Inside a high-efficiency particulate air (HEPA) filtered hood, a technician aseptically dispensed 1 mL of the assay fluid from the reservoir syringe into a sterile test tube. This initial sample was the time=0 sample for that cartridge/syringe test unit. Gloves were worn during this step and changed after every sample. The sample collection step was performed on all samples and controls before proceeding to the next step.

After dispensing 1 mL, the 60 mL reservoir syringe was aseptically attached to one port of a sterile 3-way stopcock having luer-lock fittings. A 3 mL syringe for sample collection was then attached to another port of the 3-way stopcock. Finally, a test cartridge was attached to the third port of the 3-way stopcock. Approximately 1 mL of the SCDBC was dispensed from the reservoir syringe through the test cartridge. The fluid dispensed was not collected for assay but was used simply to simulate use of the test cartridge. The tip of the cartridge was then contaminated by immersing it approximately 0.5 cm into the culture suspension. The contaminated culture completely covered the opening of the cartridge without wetting the luer lock area. The entire unit (syringes, stopcock and cartridge) was placed on a flat surface and allowed to sit at room temperature (21±2° C.) for 24±4 hours.

Following the 24-hour incubation period, a sample was collected from the reservoir syringe. The port to the cartridge was closed and approximately 1 mL of media was drawn out of the reservoir syringe into the sampling syringe. The syringe containing the 1 mL sample was removed and set aside. It was replaced by a sterile 3 mL syringe which was used for the next day's sample collection. The samples then underwent the dispensing and contamination steps. The testing was conducted for 21 days unless the plaque assay detected virus in the samples collected from the syringe for four days in a row, at which point further testing of the positive sample was terminated.

Controls

Ten negative controls and three positive controls were included in the testing program. The negative controls consisted of sterile test units (reservoir syringe. sampling syringe, 3-way stopcock and cartridge) prepared in the same manner as the test units, except that the exit port of these cartridge units was sealed with a clear sealant to prevent entry of virus into the system. The positive controls consisted of sterile test units prepared in the same way as the test units, except that the elastomeric sheath was slit, facilitating entry of the challenging virus.

A growth promotion test was performed on the media in the syringes of the test units that were negative at the end of the test period. The test involved inoculating 1 mL of media from the reservoir syringe with 0.1 mL of viral culture containing <100 PFU. A plaque assay was performed on the aliquot to determine if the challenge organism was present.

Plaque Assay Procedure (Units Tested Against ΦX174)

The aliquot collected in the 3 mL sampling syringe was assayed for the presence of ΦX174 by placing the 1 mL aliquot into 3 mL of molten (45±2° C.) top agar. Approximately 2 drops of E. coli were added to the molten top agar, and poured over the surface of a bottom agar plate and allowed to solidify. The plates were incubated at 37±2° C. for 18–hours. Results were scored as "positive" or "negative", depending on whether the challenge organism was detected in the assay fluid. "Positive" indicated the detectable presence of ΦX174 and "negative" indicated that ΦX174 was not detected.

Results

Assay results from the first week (Tables 1A and 1B) demonstrated negative results for the negative controls and positive results for the positive controls by day one. Testing of the positive controls was discontinued after four consecutive days of growth. One sample cartridge (Number 15) had growth on day 2. However, samples taken from this cartridge on subsequent days showed no growth.

No growth was observed in any of the thirty test units during the second week (Tables 2A and 2B) of testing. The negative controls remained negative.

Data from week three (Tables 3A and 3B) demonstrated growth in four samples (cartridge numbers 4, 14, 20 and 25) and one negative control (NEG 5) on three separate days (day 15, 17 and 21).

Since no test units demonstrated breakthroughs on consecutive days as would be expected if the virus had actually passed through the cartridge, we believe that the plaques assayed in the test samples are from environmental contamination. The occurrence of growth in a negative control strengthens this position because the exit port of negative controls were sealed with a clear silicone sealant that prevented entry of the challenge organism through the cartridge.

Even the high titer of the spurious contamination seen in samples #4 and #15 can be attributed to environmental contamination. The test virus is very stable and survives drying well. Approximately $3.3–4.2 \times 10^3$ ΦX174 bacteriophage particles can be contained within a 0.1 μm particle. This is well above the number of spurious plaques seen. The sedimentation rate of a 0.1 μm airborne particle is approximately 0.115 inches per hour according to the U.S. Department of Health. The test samples were maintained in an open laboratory and handled daily. It should be noted that the challenge organism, ΦX174, will not grow in the test systems and is non-motile. Consequently, it can gain entry to the test aliquots in only two ways: through airborne contact during assay, i.e., via fluid aspiration whereby viral organisms are dispensed in the air and contact the assay plate and/or transferred across the cartridge by diffusion. Based on the characteristics of the challenge organism and the results, the latter is unlikely. The plaques observed in this study are probably due to cross-contamination with heavily contaminated syringes and devices.

A growth promotion test was done on a 1 mL aliquot of media taken from the reservoir syringe of the 30 test samples and ten negative controls which did not have consistent growth by day 21. The aliquots were inoculated with 0.5 mL of challenge culture containing approximately 16 PFU. Growth was seen in all of the inoculated aliquots.

Discussion

Waterfall Company's MicroBarrier™ Cartridge for use in Multidose Dispensing and Delivery Systems for viscous flowable materials is designed to prevent the influx of external contaminants during and between deliveries over prolonged periods of time. The potential for viral contamination is a concern for many flowable products, especially when dispensing mind delivering systems are used for discharging multi-use products and for products which are used over prolonged periods of time.

The choice of a viral model to evaluate the barrier effectiveness of Waterfall's technology is important for its use in excluding bloodborne pathogens. There are problems associated with utilizing the actual bloodborne pathogens as test organisms. Hepatitis-B virus (HBV) and Hepatitis-C virus (HCV) cannot be grown in the laboratory. Human immunodeficiency virus (HIV) represents a significant safety and liability consideration due to its high infectivity potential and requirements for extreme and expensive precautions.

Therefore, a model for the bloodborne pathogens was researched. The ideal properties of a surrogate would include small size, spherical or polyhedral [almost round] morphology, environmental stability, low or non-human infectivity, high assay sensitivity, rapid growth, and an attainable high titer. The ΦX174 bacteriophage was selected as the most appropriate surrogate for the bloodborne pathogens mentioned because it satisfies all of these criteria. The ΦX174 bacteriophage has no envelope and is 25–27 nm in size [similar to HCV, the smallest pathogen], has an icosahedral or nearly spherical morphology similar to all three viral pathogens mentioned, has excellent environmental stability, is non-infectious to humans, has a limit of detection which approaches a single virus particle, grows very rapidly [assay results can be read within as little as 4–9 hours], and can be cultivated to reach very high titers similar to HBV [the most concentrated pathogen mentioned].

Animal virus surrogates are not used as they require specialized cell culture and enzyme assay techniques. In addition, the stability of most of the animal viruses is less than desirable and plating efficiency is low or unknown. Despite the variety of viral coats or surfaces [i.e., lipophilic, hydrophilic, etc.], they generally perform similarly in barrier or penetration tests. This is because viruses adopt the charge of the liquid in which they are suspended and are more affected by the liquid vehicle than by their own physical or chemical properties.

In order to simulate the viscosity of the fluids for which this product is designed, corn starch was added to the growth media at a concentration of 4 g/100 mL (4% w/v) which results in an absolute viscosity of approximately 2,000 cP at 21±2° C.

Summary

Over the three-week test period, 30 Waterfall MicroBarrier™ test cartridges were challenged daily with ΦX174 ($\approx 10^8$ PFU/mL). The reservoir solutions in the syringe were tested for ΦX174 daily using a plaque assay procedure using *E. Coli.* Four of the 30 cartridges had plaques on one or more days. This corresponds to an apparent barrier performance of 87%. However, because none of the test samples assayed positive on successive days it is likely that these four positive test results are due to environmental contaminants representing a baseline error. It is relatively easy to aerosolize ΦX174 and have viral particles contaminate the sampling process.

Moreover, the presence of virus in the reservoir solution of the negative control cartridge, having a silicone-plugged entry and exit port, indicates the viral particles were airborne and did not break through the cartridge. Therefore, we believe that the test sample positives on assays resulted from environmental contamination and that Waterfall's MicroBarrier™ cartridges were 100% effective barriers in preventing the entry of viral particles throughout the three-week test period.

By comparison, such barriers as surgical gloves and condoms may vary from lot to lot and range from less than 50% up to 100% barrier performance, when tested with the same virus over 60 minutes.

TABLE 1A

Viral Challenge Results - Week 1

| CARTRIDGE | TEST DAY NUMBER | | | | | | | |
|---|---|---|---|---|---|---|---|---|
| NUMBER | 0 | 1 | 2 | 3 | 4 | 5 | 6 | 7 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |

TABLE 1A-continued

Viral Challenge Results - Week 1

| CARTRIDGE | TEST DAY NUMBER | | | | | | | |
|---|---|---|---|---|---|---|---|---|
| NUMBER | 0 | 1 | 2 | 3 | 4 | 5 | 6 | 7 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 100 | 0 | 0 | 0 | 0 | 0 |
| 16 | 0 | 0 | 0 | 0 | 0 | 0 | 0 | 0 |
| 17 | 0 | 0 | 0 | 0 | 0 | 0 | 0 | 0 |
| 18 | 0 | 0 | 0 | 0 | 0 | 0 | 0 | 0 |
| 19 | 0 | 0 | 0 | 0 | 0 | 0 | 0 | 0 |
| 20 | 0 | 0 | 0 | 0 | 0 | 0 | 0 | 0 |
| 21 | 0 | 0 | 0 | 0 | 0 | 0 | 0 | 0 |
| 22 | 0 | 0 | 0 | 0 | 0 | 0 | 0 | 0 |
| 23 | 0 | 0 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |
| 26 | 0 | 0 | 0 | 0 | 0 | 0 | 0 | 0 |
| 27 | 0 | 0 | 0 | 0 | 0 | 0 | 0 | 0 |
| 28 | 0 | 0 | 0 | 0 | 0 | 0 | 0 | 0 |
| 29 | 0 | 0 | 0 | 0 | 0 | 0 | 0 | 0 |
| 30 | 0 | 0 | 0 | 0 | 0 | 0 | 0 | 0 |

Test results are given in plaque forming units (PFU).

TABLE 1B

Viral Challenge Results - Week 1

| CARTRIDGE | TEST DAY NUMBER | | | | | | | |
|---|---|---|---|---|---|---|---|---|
| NUMBER | 0 | 1 | 2 | 3 | 4 | 5 | 6 | 7 |
| POS #1 | 0 | <10 | <10 | 43 | 50 | * | * | * |
| POS #2 | 0 | TNTC | TNTC | TNTC | TNTC | * | * | * |
| POS #3 | 0 | TNTC | TNTC | TNTC | TNTC | * | * | * |
| NEG #1 | 0 | 0 | 0 | 0 | 0 | 0 | 0 | 0 |
| NEG #2 | 0 | 0 | 0 | 0 | 0 | 0 | 0 | 0 |
| NEG #3 | 0 | 0 | 0 | 0 | 0 | 0 | 0 | 0 |
| NEG #4 | 0 | 0 | 0 | 0 | 0 | 0 | 0 | 0 |
| NEG #5 | 0 | 0 | 0 | 0 | 0 | 0 | 0 | 0 |
| NEG #6 | 0 | 0 | 0 | 0 | 0 | 0 | 0 | 0 |
| NEG #7 | 0 | 0 | 0 | 0 | 0 | 0 | 0 | 0 |
| NEG #8 | 0 | 0 | 0 | 0 | 0 | 0 | 0 | 0 |
| NEG #9 | 0 | 0 | 0 | 0 | 0 | 0 | 0 | 0 |
| NEG #10 | 0 | 0 | 0 | 0 | 0 | 0 | 0 | 0 |

Test results are given in plaque forming units (PFU).
*Testing of the positive controls was terminated.
TNTC = Too numerous to count.

TABLE 2A

Viral Challenge Results - Week 2

| CARTRIDGE | TEST DAY NUMBER | | | | | | |
|---|---|---|---|---|---|---|---|
| NUMBER | 8 | 9 | 10 | 11 | 12 | 13 | 14 |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |

TABLE 2A-continued Viral Challenge Results - Week 2

| CARTRIDGE NUMBER | TEST DAY NUMBER | | | | | | |
|---|---|---|---|---|---|---|---|
| | 8 | 9 | 10 | 11 | 12 | 13 | 14 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |
| 21 | 0 | 0 | 0 | 0 | 0 | 0 | 0 |
| 22 | 0 | 0 | 0 | 0 | 0 | 0 | 0 |
| 23 | 0 | 0 | 0 | 0 | 0 | 0 | 0 |
| 24 | 0 | 0 | 0 | 0 | 0 | 0 | 0 |
| 25 | 0 | 0 | 0 | 0 | 0 | 0 | 0 |
| 26 | 0 | 0 | 0 | 0 | 0 | 0 | 0 |
| 27 | 0 | 0 | 0 | 0 | 0 | 0 | 0 |
| 28 | 0 | 0 | 0 | 0 | 0 | 0 | 0 |
| 29 | 0 | 0 | 0 | 0 | 0 | 0 | 0 |
| 30 | 0 | 0 | 0 | 0 | 0 | 0 | 0 |

Test results are given in plaque forming units (PFU).

TABLE 2B

Viral Challenge Results - Week 2

| CARTRIDGE NUMBER | TEST DAY NUMBER | | | | | | |
|---|---|---|---|---|---|---|---|
| | 8 | 9 | 10 | 11 | 12 | 13 | 14 |
| NEG #1 | 0 | 0 | 0 | 0 | 0 | 0 | 0 |
| NEG #2 | 0 | 0 | 0 | 0 | 0 | 0 | 0 |
| NEG #3 | 0 | 0 | 0 | 0 | 0 | 0 | 0 |
| NEG #4 | 0 | 0 | 0 | 0 | 0 | 0 | 0 |
| NEG #5 | 0 | 0 | 0 | 0 | 0 | 0 | 0 |
| NEG #6 | 0 | 0 | 0 | 0 | 0 | 0 | 0 |
| NEG #7 | 0 | 0 | 0 | 0 | 0 | 0 | 0 |
| NEG #8 | 0 | 0 | 0 | 0 | 0 | 0 | 0 |
| NEG #9 | 0 | 0 | 0 | 0 | 0 | 0 | 0 |
| NEG #10 | 0 | 0 | 0 | 0 | 0 | 0 | 0 |

Test results are given in plaque forming units (PFU).

TABLE 3A

Viral Challenge Results - Week 3

| CARTRIDGE NUMBER | TEST DAY NUMBER | | | | | | |
|---|---|---|---|---|---|---|---|
| | 15 | 16 | 17 | 18 | 19 | 20 | 21 |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | TNTC | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 1 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 1 | 0 | 0 | 0 | 0 | 0 | 0 |
| 21 | 0 | 0 | 0 | 0 | 0 | 0 | 0 |
| 22 | 0 | 0 | 0 | 0 | 0 | 0 | 0 |
| 23 | 0 | 0 | 0 | 0 | 0 | 0 | 0 |
| 24 | 0 | 0 | 0 | 0 | 0 | 0 | 0 |
| 25 | 0 | 0 | 1 | 0 | 0 | 0 | 0 |
| 26 | 0 | 0 | 0 | 0 | 0 | 0 | 0 |
| 27 | 0 | 0 | 0 | 0 | 0 | 0 | 0 |
| 28 | 0 | 0 | 0 | 0 | 0 | 0 | 0 |
| 29 | 0 | 0 | 0 | 0 | 0 | 0 | 0 |
| 30 | 0 | 0 | 0 | 0 | 0 | 0 | 0 |

Test results are given in plaque forming units (PFU).
TNTC = Too numerous to count.

TABLE 3B

Viral Challenge Results - Week 3

| CARTRIDGE NUMBER | TEST DAY NUMBER | | | | | | |
|---|---|---|---|---|---|---|---|
| | 15 | 16 | 17 | 18 | 19 | 20 | 21 |
| NEG #1 | 0 | 0 | 0 | 0 | 0 | 0 | 0 |
| NEG #2 | 0 | 0 | 0 | 0 | 0 | 0 | 0 |
| NEG #3 | 0 | 0 | 0 | 0 | 0 | 0 | 0 |
| NEG #4 | 0 | 0 | 0 | 0 | 0 | 0 | 0 |
| NEG #5 | 0 | 0 | 0 | 0 | 0 | 0 | 1 |
| NEG #6 | 0 | 0 | 0 | 0 | 0 | 0 | 0 |
| NEG #7 | 0 | 0 | 0 | 0 | 0 | 0 | 0 |
| NEG #8 | 0 | 0 | 0 | 0 | 0 | 0 | 0 |
| NEG #9 | 0 | 0 | 0 | 0 | 0 | 0 | 0 |
| NEG #10 | 0 | 0 | 0 | 0 | 0 | 0 | 0 |

Test results are given in plaque forming units (PFU).

EXAMPLE 2

Bacterial Challenge Testing With *Brevundimonas Diminuta*

[Laboratory No. 129733]

The following example provides details for the bacterial challenge testing of Waterfall's MicroBarrier™ Cartridge in Multidose Dispensing and Delivery Systems for viscous materials, Model #WFLE2aVIS 97-60A. The system design is intended to allow delivery of multiple doses of viscous fluids and prevent the influx of external contaminants over prolonged periods of time.

Microbiological evaluation was conducted by attaching each of the following: a 60 mL syringe (the media reservoir), a MicroBarrier™ Cartridge, and a 3 mL syringe (for sampling the reservoir) to one of the three ports of a three-way stopcock with luer lock fittings. The reservoir syringe was filled with sterile soybean casein digest broth containing corn starch (SCDBC). Corn starch was added to increase the viscosity of the growth media. To simulate use, an aliquot of sterile SCDBC was dispensed each day through the test cartridge. Additionally, the tip of the cartridge was contaminated by dipping it into a concentrated suspension of bacteria. The bacteria used in this study were *Brevundimonas diminuta* an average concentration greater than $1 \times 10^8$ colony forming units per mL (CFU/mL).

Each day, an aliquot of the fluid in the reservoir syringe was collected in the sampling syringe and assayed for the presence of the test organism. The study was conducted for 21 days. The results were scored as "positive" if the challenge organism was detected in the assay fluid, and "negative" if not. The study evaluated 30 cartridges. Three positive controls and three negative controls were also included in the study. A growth promotion control was done to ensure the media were capable of sustaining the challenge organism.

Cartridge Preparation

The test cartridges were sterilized by ethylene oxide gas prior to testing. Ethylene Oxide Sterilization was performed according to the following parameters:

Preconditioning: 60 minutes minimum.

Temperature: 54±2° C.

Relative Humidity: 55±10%.

Gas Concentration: 600 mg/liter±30 mg/liter.

Exposure Time: 4–5 hours.

Degassing Time: 48 hours minimum at 55±2° C.

Challenge Preparation

Approximately 100 mL of soybean casein digest broth (SCDB) was inoculated with *B. diminuta* and incubated at 30±2° C. for 24±4 hours. A new bacterial culture was made and titrated for each day of testing. Prior to using a new culture, the purity was verified with a spread plate. This new culture was used to contaminate the tips of the cartridges.

Medium Preparation

Corn starch was added to SCDB (SCDBC) to achieve a viscosity of 1,600 to 2,400 cP at 21±2° C. The mixture was heated with constant stirring to boiling. The medium was sterilized according to normal laboratory procedures. The viscosity of the medium was measured at room temperature (21±2° C.) and found to be 2008 cP.

Assay Procedure

A sterile 60 mL syringe was aseptically filled with SCDBC. Inside a high-efficiency particulate air (HEPA) filtered hood, a technician aseptically dispensed 1 drop of the assay fluid from the reservoir syringe onto a soybean casein digest broth (SCDBA) plate. This initial sample was the time=0 sample for that cartridge/syringe test unit. Gloves were worn during this step and changed after every sample. The sample collection step was performed on all samples and controls before proceeding to the next step.

After dispensing 1 drop, the 60 mL reservoir syringe was aseptically attached to one port of a sterile 3-way stopcock having luer-lock fittings. A 3 mL syringe for sample removal was then attached to another port of the 3-way stopcock. Finally, a test cartridge was attached to the third port of the 3-way stopcock. Approximately 1 mL of the SCDBC was dispensed from the reservoir syringe through the test cartridge. The fluid dispensed was not collected for assay but was used to simulate use of the test cartridge. The tip of the cartridge was then contaminated by immersing it approximately 0.5 cm into the culture suspension. The contaminated culture completely covered the opening of the cartridge without wetting the luer lock area. The entire unit (syringes, stopcock and cartridge) was placed on a flat surface and allowed to sit at room temperature (21±2° C.) for 24±4 hours.

Following the 24-hour incubation period, a sample was collected from the reservoir syringe. The port to the cartridge was closed and approximately 1 mL of media was drawn out of the reservoir syringe into the sampling syringe. The syringe containing the 1 mL sample was removed and set aside. It was replaced by a sterile 3 mL syringe which was used for the next day's sample collection. The samples then underwent the dispensing and contamination steps. The testing was conducted for a minimum of 7 days unless growth was detected in samples collected from the syringe for four days in a row, at which point further testing of the positive sample was terminated.

Controls

Three negative and three positive controls were included in the testing program. The negative controls consisted of sterile test units (reservoir syringe, sampling syringe, 3-way stopcock and cartridge) prepared in the same manner as the sample test units, except that the exit ports of these cartridge units were sealed with a clear sealant to prevent entry of bacteria into the system. The positive controls consisted of sterile test units prepared in the same way as the sample test units, except that the elastomeric sheath was slit, facilitating entry of the challenging bacteria.

A growth promotion test was performed on the media in the syringes of the test units that were negative at the end of the 21-day test. The test involved inoculating 1 mL of media from the reservoir syringe with 0.1 mL of a *B. diminuta* culture containing <100 CFU or <10 CFU when possible. The media was incubated for 24–48 hours at 37±2° C. An aliquot of the media was then assayed to determine if the challenge organism was present.

Assay Procedure For *B. Diminuta:*

The sample collected was assayed qualitatively for growth by placing a drop on SCDA and incubating it for 24–72 hours at 37±2° C. The remainder of the sample was saved in a refrigerator in the event that a confirmation of results was necessary. Growth occurring on the SCDA plate was tested biochemically to determine if the isolated organism was *B. diminuta*. A stain revealing Gram negative rods and a positive oxidase test was considered confirmation of the challenge organism.

Results

No *B. diminuta* growth was observed in any of the thirty test units during the first week of testing. The negative controls were negative. The positive controls were positive for *B. diminuta* by day one. Testing of the positive controls was discontinued after four consecutive days of growth. The results from week one are detailed in Table 4.

No *B. diminuta* growth was observed in any of the thirty test units during the second week of testing. The negative controls remained negative. The results from week two are detailed in Table 5.

One sample (#26) was positive on days 16 through 19, so testing of this cartridge was discontinued. The growth on the SCDA plate was tested and biochemically found to be an organism other than *B. diminuta*. Because this growth was not *B. diminuta*, the cartridge was not considered to have failed the challenge. Testing was discontinued because the contaminant might have prevented growth of the challenge organism had it passed through the cartridge. No *B. diminuta* growth was observed in any of the other 29 test units during the third week of testing. The negative controls remained the same for the third week. The results from week three are tailed in Table 6. In summary, the 29 surviving samples successfully resisted breakthrough by *B. diminuta* and represent a 100% effective barrier.

Discussion

The Waterfall Company's MicroBarrier™ Cartridge in Multidose Dispensing and Delivery Systems for viscous materials, Model #WFLE2aVIS 97-60A was designed to prevent the influx of external contaminants during and between deliveries.

The potential for bacterial contamination is a concern for many flowable products, especially when dispensing and delivering systems are used for discharging multi-use products and for products which are used over prolonged periods of time.

The selection of Brevundimonas diminuta as the challenge organism was based on its small size when grown under carefully controlled conditions. When properly cultured many Brevundimonas will pass through a 0.45 μm membrane filter. The small size of the organism represented a severe bacterial challenge to the test cartridges. B. diminuta is also the organism of choice for conducting membrane filter validation testing for pharmaceutical processes. The rapid motility of this challenge organism, as well as its possession of a sensory apparatus that drives the organism to nutrients, enhanced the severity of the test challenge.

In order to simulate the viscosity of the fluids for which this product is designed, corn starch was added to the growth media at a concentration of 4 g/100 L (4% w/v) which resulted in an absolute viscosity of approximately 2,000 cP at 21±2° C.

The selection of daily dispensing of the nutritive media represented a severe challenge. The daily contamination with a new culture and the 24 hours to permit growth through the mechanism was more severe than a test which involves only frequent dispensing steps. In addition, while the protocol required the challenge level to be >$10^6$, the average titer of the challenge used was actually >$10^8$.

Summary

The Waterfall Company's MicroBarrier™ Cartridges were challenged daily with Brevundimonas diminuta, a small, highly motile bacterium. The challenge test procedure consisted of (1) dispensing of nutritive media through the cartridge, (2) contamination of the cartridge tips by immersing them into a concentrated bacterial suspension $10^8$ CFU/mL and (3) placing each cartridge and syringe on a horizontal surface for 24 hours incubation at 21±2° C. The cartridges provided complete sterility for 21 days. This corresponds to a 100% effective barrier against a daily challenge with $10^8$ CFU/mL of B. diminuta for three weeks.

The unique design of the device makes comparison to other conventional microbial barriers difficult. However, the device performed comparable or superior to that seen in our laboratory for 0.45 μm microporous membranes.

TABLE 4

Bacterial Challenge Results - Week 1

| CARTRIDGE NUMBER | TEST DAY NUMBER | | | | | | | |
|---|---|---|---|---|---|---|---|---|
| | 0 | 1 | 2 | 3 | 4 | 5 | 6 | 7 |
| 1 | 0 | 0 | 0 | 0 | 0 | 0 | 0 | 0 |
| 2 | 0 | 0 | 0 | 0 | 0 | 0 | +$ | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 0 | 0 | 0 | 0 | 0 | 0 |
| 16 | 0 | 0 | 0 | 0 | 0 | 0 | 0 | 0 |
| 17 | 0 | 0 | 0 | 0 | 0 | 0 | 0 | 0 |
| 18 | 0 | 0 | 0 | 0 | 0 | 0 | 0 | 0 |
| 19 | 0 | 0 | 0 | 0 | 0 | 0 | 0 | 0 |

TABLE 4-continued

Bacterial Challenge Results - Week 1

| CARTRIDGE NUMBER | TEST DAY NUMBER | | | | | | | |
|---|---|---|---|---|---|---|---|---|
| | 0 | 1 | 2 | 3 | 4 | 5 | 6 | 7 |
| 20 | 0 | 0 | 0 | 0 | 0 | 0 | 0 | 0 |
| 21 | 0 | 0 | 0 | 0 | 0 | 0 | 0 | 0 |
| 22 | 0 | 0 | 0 | 0 | 0 | 0 | 0 | 0 |
| 23 | 0 | 0 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |
| 26 | 0 | 0 | 0 | 0 | 0 | 0 | 0 | 0 |
| 27 | 0 | 0 | 0 | 0 | 0 | 0 | 0 | 0 |
| 28 | 0 | 0 | 0 | 0 | 0 | 0 | 0 | 0 |
| 29 | 0 | 0 | 0 | 0 | 0 | 0 | 0 | 0 |
| 30 | 0 | 0 | 0 | 0 | 0 | 0 | 0 | 0 |
| POS #1 | 0 | + | + | * | * | * | * | * |
| POS #2 | 0 | + | + | * | * | * | * | * |
| POS #3 | 0 | + | + | * | * | * | * | * |
| NEG #1 | 0 | 0 | 0 | 0 | 0 | 0 | 0 | 0 |
| NEG #2 | 0 | 0 | 0 | 0 | 0 | 0 | 0 | 0 |
| NEG #3 | 0 | 0 | 0 | 0 | 0 | 0 | 0 | 0 |

Results were recorded as + (growth) or 0 (no growth)
* Testing of the positive controls was terminated.
$Sample was positive on one day. Due to the nature of the challenge organism, this was likely due to laboratory contamination.

TABLE 5

Bacterial Challenge Results - Week 2

| CARTRIDGE NUMBER | TEST DAY NUMBER | | | | | | |
|---|---|---|---|---|---|---|---|
| | 8 | 9 | 10 | 11 | 12 | 13 | 14 |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |
| 21 | 0 | 0 | 0 | 0 | 0 | 0 | 0 |
| 22 | 0 | 0 | 0 | 0 | 0 | 0 | 0 |
| 23 | 0 | 0 | 0 | 0 | 0 | 0 | 0 |
| 24 | 0 | 0 | 0 | 0 | 0 | 0 | 0 |
| 25 | 0 | 0 | 0 | 0 | 0 | 0 | 0 |
| 26 | 0 | 0 | 0 | 0 | 0 | 0 | 0 |
| 27 | 0 | 0 | 0 | 0 | 0 | 0 | 0 |
| 28 | 0 | 0 | 0 | 0 | 0 | 0 | 0 |
| 29 | 0 | 0 | 0 | 0 | 0 | 0 | 0 |
| 30 | 0 | 0 | 0 | 0 | 0 | 0 | 0 |
| NEG #1 | 0 | 0 | 0 | 0 | 0 | 0 | 0 |
| NEG #2 | 0 | 0 | 0 | 0 | 0 | 0 | 0 |
| NEG #3 | 0 | 0 | 0 | 0 | 0 | 0 | 0 |

Results were recorded as + (growth) or 0 (no growth)

TABLE 6

Bacterial Challenge Results - Week 3

| CARTRIDGE NUMBER | TEST DAY NUMBER | | | | | | |
|---|---|---|---|---|---|---|---|
| | 15 | 16 | 17 | 18 | 19 | 20 | 21 |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |
| 21 | 0 | 0 | 0 | 0 | 0 | 0 | 0 |
| 22 | 0 | 0 | 0 | 0 | 0 | 0 | 0 |
| 23 | 0 | 0 | 0 | 0 | 0 | 0 | 0 |
| 24 | 0 | 0 | 0 | 0 | 0 | 0 | 0 |
| 25 | 0 | 0 | 0 | 0 | 0 | 0 | 0 |
| 26 | 0 | +* | +* | +* | +* | +* | +* |
| 27 | 0 | 0 | 0 | 0 | 0 | 0 | 0 |
| 28 | 0 | 0 | 0 | 0 | 0 | 0 | 0 |
| 29 | 0 | 0 | 0 | 0 | 0 | 0 | 0 |
| 30 | 0 | 0 | 0 | 0 | 0 | 0 | 0 |
| NEG #1 | 0 | 0 | 0 | 0 | 0 | 0 | 0 |
| NEG #2 | 0 | 0 | 0 | 0 | 0 | 0 | 0 |
| NEG #3 | 0 | 0 | 0 | 0 | 0 | 0 | 0 |

Results were recorded as + (growth) or 0 (no growth)
*Growth in syringe was determined to be a contaminant rather than *B. diminuta*.

It will be appreciated that the foregoing aspects of the invention provide a system for dispensing and delivering a wide range of flowable media, including liquids, solutions, suspensions, dispersions, lotions, creams, gels, and salves. These flowable media either can be volatile or non-volatile, aqueous or non-aqueous, and classified as inorganic or organic fluids, as well as combinations thereof. The present invention has application as a dispensing and delivery system for fluids used in any industry.

While the invention has been described in connection with what is presently considered to be the most practical and preferred embodiments, it is to be understood that the invention is not limited to the enclosed embodiments, but on the contrary, is intended to cover various modifications and equivalent arrangements included within the spirit and scope of the appended claims. For example, one or more vanes may extend across the diameter of the seat. Likewise, the seat may comprise one or more sectors, or one or more channels may be disposed through the seat such that each sector or channel defines a unidirectional laminar tube of flow through the seat. A blocking portion could be provided at any convenient location in the seat to occlude the bore of an adjacent seal when the seal and seat are in a closed position. The blocking portion need only be aligned in the flow path and shaped so as not to induce turbulent flow when the seal and seat are in an open position.

The seat also can comprise a tube having an inlet and an outlet with a blocking portion on an edge of the outlet. An adjacent seal has a bore having an inlet coextensive with the blocking portion and an outlet orifice. The bore prevents flow when conformably engaged against the seal in a closed state and enables flow in an open state, respectively. In this embodiment, the bore does not need to be centrally located, but rather is aligned with the blocking portion of the seat.

What is important is that the peripheral surface of the tube constrains the fluid flow through the tube, and the bore of the seal similarly constrains the flow path. Upon transition to the closed state, the seal still contacts at a sealing surface with the seat to generate an impulse wave so that the flow is effected without separation of a boundary layer sufficiently downstream of the seal outlet orifice such that no reflux or reverse flow can occur. Any excess flowable material is entrapped at the sealing surface and prevents air or any other external contaminant from migrating back through the flow path. However, in such structures, the seat still provides unidirectional laminar flow of a flowable medium along a flow path.

Therefore, persons of ordinary skill in this field are to understand that all such equivalent structures are to be included within the scope of the following claims.

I claim:

1. A system for contamination-free delivery of a flowable material from an enclosed flow path comprising:

a seat having a solid portion and a reversibly deformable seal having a perforation disposed in the flow path, said seal and seat being moveable between a closed position and open position upon deformation of the seal by a mechanical force, electromagnetic field, thermal variation, or other action sufficient to cause said deformation;

the seat provided for constraining the flowable material to assume a tube of flow through the seat;

and wherein the perforation of the seal conformably engages against the solid portion of the seat in the closed position to create a sealing surface between the seal and seat; such that flowable material at the sealing surface is entrapped as one or more layers for bonding the seal and seat, and said entrapped material is unavailable for back flow migration of contaminating matter.

2. A system for delivering a flowable material from a reservoir and for maintaining the integrity and sterility of the flowable material comprising:

a seat operatively connected with the reservoir for defining a flow path for the flowable material; said seat comprising one or more vanes, each vane having a major surface aligned for imparting unidirectional laminar flow in the flow path, and a blocking portion for preventing flow when an adjacent seal is conformably mated with the seat in a first or closed state;

said seal responsive to an applied pressure comprising a sealing surface for conformably mating with the seat to prevent flow in said first state, said sealing surface defining a bore coaxially aligned with the blocking portion of the seat for enabling unidirectional flow through the bore when the seal and seat are in a second or open state;

means for activating and deactivating the pressure to enable said seal to transition reversibly between the first and second states.

3. A system according to claim 2 wherein the one or more vanes of the seat are characterized by an edge surface disposed for mating with the seal at said sealing surface such that the locus of vane edge surfaces forms a substantially arcuate surface for imparting a predetermined stress to the seal for locking the seal and seat together in a seal-tight engagement which is effective against external contamination.

4. A system according to claim 2 wherein the mating surfaces of the seal and seat are characterized by a surface uniformity having, a range of substantially 0 to about 5 microns.

5. A system according to claim 2 wherein residual flowable material between the mating surfaces of the seal and seat comprises one or more molecular layers insufficient for the entry of external matter.

6. A system according to claim 2 wherein the seal comprises a reversibly deformable material having a memory effect such that the transition from the open to closed state is characterized by a contraction toward the bore which prevents backflow or entry of contaminants into the system.

7. A system according to claim 2 wherein the seal comprises an elastomeric material responsive to a positive or negative pressure for enabling the seal to transition reversibly between the first and second states.

8. A system according to claim 2 wherein the seal comprises a shape memory alloy responsive to the application of an energy field sufficient to induce a phase change thereby effecting the reversible transition between the first and second states.

9. A delivery system for contamination-safe dispensing of a flowable material characterized by an inherent internal pressure and for maintaining the internal pressure of the flowable material comprising:
- a reservoir for containing the flowable material,
- a seal comprising a reversibly deformable surface responsive to an activation pressure for transitioning between a closed state and an open state, said surface defining a bore extending therethrough for providing a flow path for the flowable medium;
- a seat comprising a periphery for enclosing the seal, a solid portion aligned with the bore for preventing flow when the seal and seat are conformably engaged in the closed state, one or more vanes depending from the periphery, each vane having a major surface aligned for imparting unidirectional laminar flow along the flow path; each vane further comprising a seal contacting edge for imparting an arcuate shape to the seal, transverse to the flow path to thereby apply the internal pressure of the flowable material against the seal when the seal and seat are conformably engaged in the closed state;
- means for activating and deactivating the seal to transition the seal between the open and closed states.

10. A system according to claim 9 wherein the radius of curvature of the arcuate surface of the seat and the durometer of the seal can be varied to provide a desired cracking pressure for the flowable material.

11. A device for delivering a flowable material without external contamination comprising:
- a reservoir for containing the flowable material;
- a seat comprising a periphery for defining a flow path, one or more vanes disposed for imparting a unidirectional laminar flow of material out of the reservoir, and a blocking portion disposed for preventing flow;
- a reversibly deformable seal responsive to the application and removal of a pressure for effecting a transition between a closed position and an open position with respect to the seat, said seal comprising a sealing surface including a bore coextensive with the blocking portion of the seat for mating engagement with the seat and preventing flow when the seal is in the closed position;
- means for providing an activation pressure to the seal for effecting a transition of the sealing surface to a second or open position with respect to the seat to enable unidirectional flow of the material from the seat and through the bore of the seal; and
- wherein the transition of the seal from the open to the closed state is characterized by a strong contraction toward the bore center to expel sufficient flowable material from the bore so as to eliminate a path for entry of external contaminants.

12. A device according to claim 11 wherein the seal and seat are incorporated into the neck of a squeezable tube.

13. A device according to claim 11 wherein the one or more vanes of the seat and blocking portion of the seat are disposed to form a sealing surface transverse to the flow path for mating engagement against the seal, thereby imparting a predetermined cracking pressure to the seal.

14. A device according to claim 11 wherein the reservoir comprises a volumetrically reducible reservoir.

15. A unidirectional valve for placement in an in vivo or in vitro flow path of a flowable medium comprising:
- a seat having a peripheral surface for enclosing the flow path, including one or more vanes disposed in the flow path, each vane having a major surface imparting a unidirectional laminar flow to the flowable medium, said seat further comprising a blocking portion disposed substantially transverse to the flow path;
- a reversibly deformable seal responsive to an activation pressure for transitioning between a closed position and an open position with respect to the seat, said seal comprising a sealing surface including a bore having an entrance aligned with the blocking portion of the seat for preventing flow through or across the seal when the seal is conformably engaged against the seat in the closed position;
- said bore having an outlet defining unidirectional laminar flow of the flowable medium through the seal and seat when the seal is separated from the seat in the second or open position.

16. A valve according to claim 15 wherein the seal comprises a reversibly deformable material having a memory effect such that the transition from the open state to the closed state is substantially simultaneous with the removal of the activation pressure and expels excess flowable medium out through the bore.

17. A valve according to claim 15 wherein the transition of the seal from the open to the closed state is characterized by a strong contraction of the seal toward the bore to provide a self-cleaning impulse wave for expelling the flowable medium from said outlet and confining any medium not expelled at said sealing surface.

18. A delivery system for maintaining the sterility and integrity of a flowable medium contained in a reservoir comprising:
- a seat comprising a first solid portion and a peripheral surface disposed for producing a tube of flow of the flowable material out of the reservoir, said peripheral surfaces constraining the flowable medium in a flow path through the seat which is characterized by a reduced boundary layer insufficient for the entry of external matter;
- a seal for transitioning between a closed and open position with respect to the seat, comprising a sealing surface for conformable engagement against the seat for blocking the flow path when the seal and seat are engaged in the closed position, said sealing surface further defining a bore having an inlet coextensive with said first portion of the seat, said bore including an outlet for conducting flow of the flowable material when the seal and seat are in the open position;

means for affecting a transition of the seal and seat between said closed and open positions.

19. A delivery system according to claim 18 wherein the seal comprises a reversibly deformable elastomeric material responsive to the application of a positive or negative pressure to effect the transition between the open and closed states.

20. A delivery system according to claim 18 wherein the seal comprises a reversibly deformable material and said transition to said closed position is characterized by concentric contraction toward said bore to thereby generate an impulse wave to expel substantially all of the flowable material downstream of the outlet and to confine at said sealing surface any flowable material not expelled.

21. A delivery system according to claim 18 wherein the seal comprises a shape memory material responsive to the application of energy sufficient to effect a phase change for the transition between the open and closed states.

22. A one-way system for in vivo or in vitro placement in a flow path of flowable material and for maintaining the sterility and integrity of the flowable material comprising:

a seat including a first solid portion and a second portion for defining a mass flow streamline of flowable material therethrough;

a seal having a sealing surface operatively connected with the seat for blocking the mass flow streamline in a first state, said seal including a bore aligned with the solid portion of the seat and having an inlet disposed for receiving the mass flow streamline and an outlet for convecting said mass flow streamline downstream from the outlet when the seal is in a second state wherein the transition from the second to the first state truncates the mass flow streamline downstream from the seat and residual mass flow at the sealing surface forms a barrier preventing any matter downstream from said outlet from migrating upstream past said outlet.

23. A device disposed in a flow path for controlling a flowable material comprising:

a seat comprising a solid portion and a peripheral surface for constraining the flow path to assume a tube of flow;

a reversibly deformable seal for transitioning between a closed and open position with respect to the seat, said seal comprising a periphery substantially coextensive with the solid portion of the seat, and a bore extending through the seal, and a sealing surface disposed for airtight mating engagement against the seat for blocking the tube of flow in said closed position and for enabling the tube of flow to continue through the bore and through an exit orifice of said bore in said open position, such that the transition to the closed position is characterized by a preferential contraction of the seal from the periphery toward the bore to thereby expel said flowable material through the exit orifice sufficiently downstream of the exit orifice to prevent reflux or back flow; and means for effecting the transition of the seal between said closed and open positions.

24. A delivery system according to claim 23 wherein the seal comprises a reversibly deformable elastomeric material responsive to an applied positive or negative pressure for effecting the transition between the closed and open positions.

25. A delivery system according to claim 23 wherein the exit orifice comprises an annular reinforced portion disposed around the bore to maintain concentric contraction of the seal toward the bore center and thereby generate an impulse wave sufficient to expel residual flowable material from said bore.

26. A system according to claim 25 wherein the sealing surface further provides a means for confining any flowable material not expelled to form a barrier effective against entry of external matter.

27. A delivery system according to claim 23 wherein the seal comprises a shape memory material characterized by a reversible transition between said closed and open positions upon the application and withdrawal of sufficient energy to effect a phase transformation of said shape memory material.

28. A delivery system for providing a closeable flow path and delivery of a flowable material while maintaining the integrity and sterility of said flowable material comprising:

a seat comprising at least one passageway for constraining the flow path to a tube of flow, said seat having a solid barrier surface for mating conformably with a perforated seal for blocking the flow path when the seal and seat are in a first state;

the seal having a sealing surface for conformably mating with the seat and blocking flow of the flowable material in the first state, said sealing surface including a perforation for enabling direct flow of the flowable material through the perforation when the seal and seat are in a second state, wherein flowable material entrapped at said sealing surface comprises a barrier to the entry of external matter in the flow path upstream of the sealing surface.

29. A contamination free valve for dispensing a beverage from a vending machine or the like comprising:

a seat comprising an inlet for receiving the beverage, a peripheral surface for constraining the beverage to assume a tube of flow through the seat, and a solid mating surface;

a reversibly deformable seal comprising a sealing surface for transitioning between a closed and open state with respect to the seat, including a bore coaligned with the mating surface of the seat for mating engagement with the seat in the closed position, and for enabling the tube of flow through the bore when the seal and seat are in the open position, such that upon transition to the closed position, any residual beverage is confined at the sealing surface, thereby forming a barrier to the entry of external matter.

* * * * *